US011516785B2

(12) United States Patent
Wang et al.

(10) Patent No.: US 11,516,785 B2
(45) Date of Patent: Nov. 29, 2022

(54) NETWORK DEVICE FOR DETERMINING SEARCH SPACES

(71) Applicant: HUAWEI TECHNOLOGIES CO., LTD., Guangdong (CN)

(72) Inventors: Ting Wang, Shanghai (CN); Jinyao Liang, Shenzhen (CN); Shengyue Dou, Shanghai (CN); Yuanjie Li, Shanghai (CN)

(73) Assignee: Huawei Technologies Co., Ltd., Guangdong (CN)

( * ) Notice: Subject to any disclaimer, the term of this patent is extended or adjusted under 35 U.S.C. 154(b) by 421 days.

(21) Appl. No.: 16/580,323

(22) Filed: Sep. 24, 2019

(65) Prior Publication Data

US 2020/0022119 A1    Jan. 16, 2020

Related U.S. Application Data

(63) Continuation of application No. PCT/CN2018/079995, filed on Mar. 22, 2018.

(30) Foreign Application Priority Data

Mar. 24, 2017    (CN) .......................... 201710184759.3

(51) Int. Cl.
    *H04W 72/04*    (2009.01)
    *H04W 72/12*    (2009.01)
    *H04L 5/00*    (2006.01)

(52) U.S. Cl.
    CPC ......... *H04W 72/042* (2013.01); *H04L 5/0053* (2013.01); *H04L 5/0064* (2013.01);
    (Continued)

(58) Field of Classification Search
    CPC ........... H04W 72/042; H04W 72/0453; H04W 72/1205; H04W 72/1289; H04W 72/1257;
    (Continued)

(56) References Cited

U.S. PATENT DOCUMENTS

2011/0261768 A1    10/2011    Luo
2012/0155316 A1    6/2012    Li et al.
(Continued)

FOREIGN PATENT DOCUMENTS

CN    101714892 A    5/2010
CN    103139819 A    6/2013
(Continued)

OTHER PUBLICATIONS

Office Action issued in Japanese Application No. 2019-554264 dated Dec. 14, 2020, 6 pages (with English translation).
(Continued)

*Primary Examiner* — Omar J Ghowrwal
(74) *Attorney, Agent, or Firm* — Fish & Richardson P.C.

(57) ABSTRACT

Example channel transmission methods and apparatus are described. One example method includes determining search spaces of at least two downlink control channels by a first network device. The first network device separately determines in the search spaces resources occupied by the at least two downlink control channels. Resource scheduled by the at least two downlink control channels belong to one carrier. The first network device obtains the at least two downlink control channels by using the resources. With the embodiments of the present invention, data on one carrier can be scheduled through a plurality of downlink control channels.

1 Claim, 17 Drawing Sheets

(52) U.S. Cl.
CPC ....... *H04L 5/0091* (2013.01); *H04W 72/0453* (2013.01); *H04W 72/1205* (2013.01); *H04W 72/1257* (2013.01); *H04W 72/1289* (2013.01); H04L 5/001 (2013.01); H04L 5/0026 (2013.01); H04L 5/0035 (2013.01); Y02D 30/70 (2020.08)

(58) Field of Classification Search
CPC ... H04L 5/0053; H04L 5/0064; H04L 5/0091; H04L 5/001; H04L 5/0026; H04L 5/0035; Y02D 30/70
See application file for complete search history.

(56) References Cited

U.S. PATENT DOCUMENTS

| | | | |
|---|---|---|---|
| 2012/0207103 A1 | 8/2012 | Dai et al. | |
| 2012/0320838 A1* | 12/2012 | Yang | H04W 76/27 370/329 |
| 2013/0215853 A1 | 8/2013 | Li et al. | |
| 2017/0181137 A1 | 6/2017 | Yang et al. | |
| 2019/0089509 A1* | 3/2019 | Wong | H04L 5/0053 |
| 2019/0159226 A1* | 5/2019 | Ly | H04W 24/02 |

FOREIGN PATENT DOCUMENTS

| | | |
|---|---|---|
| CN | 103181093 A | 6/2013 |
| CN | 105939182 A | 9/2016 |
| EP | 3200530 A1 | 8/2017 |
| EP | 3297362 A1 | 3/2018 |
| WO | 2016047618 A1 | 3/2016 |
| WO | 2016186042 A1 | 11/2016 |
| WO | 2017039737 A1 | 3/2017 |
| WO | 2017043878 A1 | 3/2017 |

OTHER PUBLICATIONS

Panasonic, "EPDCCH search space and aggregation levels", 3GPP TSG RAN WG1 Meeting#70bis, R1-124555, San Diego, USA, Oct. 8-12, 2012, 6 pages.

Huawei et al., "WF on Coordinated Transmission Scheme"3GPP TSG RAN WG1 NR Ad Hoc Meeting, R1-170133 (R1-1701511), Spokane, USA, Jan. 16-20, 2017, total 3 pages of PPT.

Ericsson, "Summary of e-mail discussions on downlink control signaling",TSG-RAN WG1 #87, R1-1612908, Reno, NV, USA, Nov. 14-18, 2016, 37 pages.

Ericsson, "Summary of offline discussion on DL control channels" R1-1613720, 7.1.4.1, 7 pages, Nov. 19, 2016.

3GPP TS 36.213 V14.2.0 (Mar. 2017) 3rd Generation Partnership Project Technical Specification Group Radio Access Network Evolved Universal Terrestrial Radio Access (E-UTRA) Physical layer procedures(Release 14), 454 pages.

PCT International Search Report and Written Opinion in International Application No. PCT/CN2018/079,995, dated Jun. 11, 2020, 17 pages (With English translation).

Extended European Search Report issued in European Application No. 18772349.9 dated Feb. 17, 2020, 9 pages.

* cited by examiner

NETWORK DEVICE FOR DETERMINING SEARCH SPACES

CROSS-REFERENCE TO RELATED APPLICATIONS

This application is a continuation of International Application No. PCT/CN2018/079995, filed on Mar. 22, 2018, which claims priority to Chinese Patent Application No. 201710184759.3, filed on Mar. 24, 2017, The disclosures of the aforementioned applications are hereby incorporated by reference in their entireties.

TECHNICAL FIELD

This application relates to the field of communications technologies, and in particular, to a channel transmission method and a network device.

BACKGROUND

Currently, a coordinated multipoint transmission/reception (English: Coordinated Multiple Points Transmission/Reception, CoMP for short) technology can be used between a base station and user equipment (English: User Equipment, UE for short) for information transmission. CoMP mainly means that a plurality of geographically separated base stations coordinate with each other in transmission of a physical downlink shared channel (English: Physical Downlink Sharing Channel, PDSCH for short) data for one UE or in reception of a physical uplink shared channel (English: Physical Uplink Sharing Channel, PUSCH for short) data sent by one UE, to improve coverage performance of the UE. In an existing long term evolution (English: Long Term Evolution, LTE for short) system, physical downlink control channel (English: Physical Downlink Control Channel, PDCCH for short) sending in a cell is performed in a full bandwidth manner: a plurality of PDCCHs of one UE are collaboratively transmitted over different carriers in one subframe, where different PDCCHs are used to schedule data on different carriers. Therefore, the UE can attempt to decode, by using a radio network temporary identifier (English: RNTI Radio Network Temporary Identity, RNTI for short) of the UE, all the PDCCHs included in the subframe, to obtain a PDCCH for the UE through the decoding based on the RNTI, and send or receive information through the PDCCH. However, currently for one UE, only one PDCCH on one carrier that is scheduled for the UE can be carried in one subframe, resulting in relatively low transmission efficiency. In addition, in a coordinated transmission scenario, a plurality of base stations can perform scheduling independently, and a delay usually exists in a case of sending only one PDCCH. As a result, channel state information (English: Channel State Information, CSI for short) that is learned of before the PDCCH is sent may become invalid and information carried over the PDCCH cannot be applicable to an actual channel state. Consequently, information transmission performed based on the PDCCH is unreliable.

SUMMARY

Embodiments of the present invention provide a channel transmission method and a network device, to schedule data on one carrier through a plurality of downlink control channels, thereby improving information transmission efficiency and reliability.

According to a first aspect, an embodiment of the present invention provides a channel transmission method, including:

determining, by a first network device, search spaces of at least two downlink control channels; separately determining, in the search spaces, resources occupied by the at least two downlink control channels; and obtaining the at least two downlink control channels by using the resources, where resources scheduled by the at least two downlink control channels belong to one carrier, and the downlink control channel may include downlink scheduling information or may include uplink scheduling information.

Optionally, the at least two downlink control channels may be sent by one network device to the first network device, or may be sent by a plurality of network devices to the first network device. The first network device may be a base station or may be user equipment.

Further optionally, the search spaces of the at least two downlink control channels may be the same or may be different.

In some possible implementations, the search spaces of the at least two downlink control channels may be the same, and when determining the search spaces of the at least two downlink control channels, the first network device may determine the search spaces of the at least two downlink control channels based on a first parameter, where the first parameter may include at least one of a quantity of control channel elements (English: Control Channel Element, CCE for short), an identifier of a first time element, and a candidate location of a downlink control channel. Optionally, the first parameter may be determined by the first network device; or the first parameter may be sent to the first network device by a network device that sends the at least two downlink control channels, so that the first network device can receive the first parameter sent by at least one network device, and therefore determines the search spaces of the at least two downlink control channels based on the first parameter.

In some possible implementations, quantities of CCEs of the search spaces of the at least two downlink control channels are the same; or identifiers of first time elements of the at least two downlink control channels are determined based on subcarrier spacings of the resources occupied by the at least two downlink control channels; or identifiers of first time elements of the at least two downlink control channels are determined based on identifiers of time elements, corresponding to the first time elements of the at least two downlink control channels, among time elements corresponding to a preset subcarrier spacing; or candidate locations of the at least two downlink control channels are different, and the candidate locations of the at least two downlink control channels are determined based on a second parameter, where the second parameter includes at least one of a device type, a device identifier, and an aggregation level.

In some possible implementations, the first network device may further determine, based on time element information of the at least two downlink control channels, the quantities of CCEs corresponding to the search spaces of the at least two downlink control channels, where the time element information includes a quantity of second time elements or an identifier of a second time element. In other words, the first network device may further determine, based on the quantity of second time elements or the identifier of the second time element corresponding to the at least two downlink control channels (or the search spaces of the at least two downlink control channels), the quantities of CCEs of the search spaces of the at least two downlink control channels or quantities of CCEs of control resource sets in which the search spaces of the at least two downlink control channels are located, to determine the search spaces of the at least two downlink control channels. Optionally, a time unit corresponding to the second time element may be the same as or different from a time unit corresponding to the first time element.

In some possible implementations, the search spaces of the at least two downlink control channels may be different; and the determining, by a first network device, search spaces of at least two downlink control channels may be specifically: separately determining, by the first network device, resources occupied by the search spaces of the at least two downlink control channels, where the resources occupied by the search spaces of the at least two downlink control channels are different; and separately determining the search spaces of the at least two downlink control channels based on the resources, where the resource may include a frequency domain resource or a time domain resource.

In other words, when search spaces of a plurality of downlink control channels received by the first network device are different, when determining the search spaces of the plurality of downlink control channels, the first network device may separately determine time domain resources and/or frequency domain resources occupied by the search spaces of the plurality of downlink control channels, and separately determine the search spaces of the plurality of downlink control channels based on the resources.

In some possible implementations, the separately determining, by the first network device, resources occupied by the search spaces of the at least two downlink control channels may be specifically: determining, by the first network device, first resource configuration information, and determining, based on the first resource configuration information, the resources occupied by the search spaces of the at least two downlink control channels, where the first resource configuration information includes information about resources occupied by control resource sets in which the search spaces of the at least two downlink control channels are located, and a quantity of the search spaces corresponding to the at least two downlink control channels is the same as a quantity of control resource sets. In other words, at least two search spaces corresponding to the at least two downlink control channels may be located in at least two control resource sets, and frequency domain resources of the at least two control resource sets do not overlap, that is, the control resource sets in which the search spaces of the at least two downlink control channels are located are different.

In some possible implementations, the separately determining, by the first network device, resources occupied by the search spaces of the at least two downlink control channels may be specifically: determining, by the first network device, second resource configuration information, and determining, based on the second resource configuration information, the resources occupied by the search spaces of the at least two downlink control channels, where the second resource configuration information includes at least one of information about resources occupied by at least two control resource sets in which the search spaces of the at least two downlink control channels are located, identifiers of the at least two control resource sets, and a first offset value, the first offset value is determined based on the identifiers of the at least two control resource sets, and the resources occupied by the at least two control resource sets overlap. In other words, at least two search spaces corresponding to the at least two downlink control channels may be located in at least two control resource sets, and frequency domain resources of the at least two control resource sets may overlap completely, and a quantity of the search spaces corresponding to the at least two downlink control channels is the same as a quantity of control resource sets.

In some possible implementations, the separately determining, by the first network device, resources occupied by the search spaces of the at least two downlink control channels may be specifically: determining, by the first network device, third resource configuration information, and determining, based on the third resource configuration information, the resources occupied by the search spaces of the at least two downlink control channels, where the third resource configuration information includes at least one of information about resources occupied by control resource sets in which the search spaces of the at least two downlink control channels are located, identifiers of the search spaces of the at least two downlink control channels, and a second offset value, the second offset value is determined based on the identifiers of the search spaces of the at least two downlink control channels, and the control resource sets in which the search spaces corresponding to the at least two downlink control channels are located are the same. In other words, the search spaces corresponding to the at least two downlink control channels may be located in one control resource set.

Optionally, the first resource configuration information, the second resource configuration information, or the third resource configuration information may further carry information such as a CCE identifier, so that the search space is further determined in combination with the CCE identifier.

Further optionally, the first resource configuration information, the second resource configuration information, or the third resource configuration information may be further sent by at least one second network device to the first network device. For example, the first resource configuration information, the second resource configuration information, or the third resource configuration information is indicated by using a notification message. The second network device may be a network device that sends one or more of the at least two downlink control channels.

In some possible implementations, the resource may include a time domain resource; and the first network device may further receive a notification message sent by the at least one second network device, where the notification message may be used to indicate identifiers of third time elements occupied by the search spaces of the at least two downlink control channels. For example, the notification message may carry the identifiers of the third time elements. Optionally, a time unit corresponding to the third time element may be the same as or different from the time unit corresponding to the first time element; and the time unit corresponding to the third time element may be the same as or different from the time unit corresponding to the second time element. This is not limited in this application.

In some possible implementations, the determining, by a first network device, search spaces of at least two downlink control channels may be specifically: determining, by the first network device, the search spaces of the at least two downlink control channels based on a third parameter, where the search space includes at least one CCE, and the third parameter includes a quantity of CCEs or a CCE identifier. Therefore, the first network device can determine the search space based on the quantity of CCEs or the CCE identifier.

Further optionally, the first network device may further receive a first message sent by the at least one second network device, where the first message is used to indicate a quantity of downlink control channels to be sent, so that the first network device can obtain a downlink control channel based on the quantity, and stops blind detection after a quantity of obtained downlink control channels reaches the quantity indicated in the first message. This decreases blind detections and reduces device overheads. Alternatively, the first network device may further send a second message to the at least one second network device, where the second message is used to indicate a quantity of downlink control channels that the first network device can receive, so that the second network device can send a downlink control channel based on the quantity indicated in the second message, where a quantity of downlink control channels sent by the second network device does not exceed the quantity indicated in the second message. Optionally, a value of the quantity indicated in the first message or the second message may be related to a receiving capability of the first network device or related to a current channel condition. A stronger receiving capability indicates a larger quantity, a better channel condition indicates a larger quantity, and so on. This is not limited in this application. Further optionally, the search space may be further determined based on at least one of an aggregation level, a control information format, a control information size, and the quantity of search spaces. This can decrease blind detections and reduce system overheads.

According to a second aspect, an embodiment of the present invention provides a channel transmission method, including:

determining, by a first network device in a first search space, a first resource occupied by a first downlink control channel;

determining, by a second network device in a second search space, a second resource occupied by a second downlink control channel;

sending, by the first network device, the first downlink control channel to a third network device by using the first resource; and sending, by the second network device, the second downlink control channel to the third network device by using the second resource, where a resource scheduled by the first downlink control channel and a resource scheduled by the second downlink control channel belong to one carrier.

In some possible implementations, the first network device may determine the first search space, and the second network device determines the second search space. Optionally, the first network device and the second network device may be a same network device, that is, a same network device sends a plurality of downlink control channels to the third network device, namely, another network device; or the first network device and the second network device may be different network devices, that is, one or more network devices send a plurality of downlink control channels to the third network device. The first network device and the second network device may be base stations or may be user equipments; and the third network device may be user equipment or may be a base station. The first network device and the second network device may correspond to the at least one second network device in the channel transmission method according to the first aspect, and the third network device may correspond to the first network device in the channel transmission method according to the first aspect.

Optionally, the search spaces of the at least two downlink control channels may be the same or may be different.

In some possible implementations, the first search space may be the same as the second search space, and the first network device may determine the first search space based on a first parameter. Further optionally, the second network device may determine the second search space based on a second parameter. The first parameter or the second parameter may include at least one of a quantity of CCEs, an identifier of a first time element, and a candidate location of a downlink control channel.

Optionally, a quantity of CCEs included in the first parameter is the same as a quantity of CCEs included in the second parameter; or an identifier of a first time element of the first downlink control channel or an identifier of a first time element of the second downlink control channel is determined based on a subcarrier spacing of the first resource and a subcarrier spacing of the second resource; or an identifier of a first time element of the first downlink control channel is determined based on an identifier of a time element, corresponding to the first time element of the first downlink control channel, among time elements corresponding to a preset subcarrier spacing, and an identifier of a first time element of the second downlink control channel is determined based on an identifier of a time element, corresponding to the first time element of the second downlink control channel, among the time elements corresponding to the preset subcarrier spacing; or a candidate location of the first downlink control channel is different from a candidate location of the second downlink control channel, and the candidate location of the first downlink control channel or the candidate location of the second downlink control channel is determined based on a third parameter, where the third parameter may include at least one of a device type, a device identifier, and an aggregation level.

In some possible implementations, the first network device or the second network device may further send the first parameter and/or the second parameter and/or the third parameter to the third network device.

In some possible implementations, the first search space is different from the second search space; and that the first network device determines the first search space may be specifically: determining, by the first network device, a third resource occupied by the first search space and determines the first search space based on the third resource, where the third resource may include a frequency domain resource or a time domain resource.

In some possible implementations, that the second network device determines the second search space may be specifically: determining, by the second network device, a fourth resource occupied by the second search space and determines the second search space based on the fourth resource, where the fourth resource may include a frequency domain resource or a time domain resource.

In some possible implementations, that the first network device determines the first search space based on the third resource may be specifically: determining, by the first network device, first resource configuration information, and determining the first search space based on the first resource configuration information, where the first resource configuration information includes information about a resource occupied by a control resource set in which the first search space is located. Correspondingly, that the second network device determines the second search space based on the fourth resource may be specifically: determining, by the second network device, fourth resource configuration information, and determining the second search space based on the fourth resource configuration information, where the fourth resource configuration information includes information about a resource occupied by a control resource set in which the second search space is located.

In some possible implementations, that the first network device determines the first search space based on the third resource may be specifically: determining, by the first network device, second resource configuration information, and determining the first search space based on the second resource configuration information, where the second resource configuration information includes at least one of information about a resource occupied by a control resource set in which the first search space is located, an identifier of the control resource set, and a first offset value, and the first offset value is determined based on the identifier of the control resource set. Correspondingly, that the second network device determines the first search space based on the fourth resource may be specifically: determining, by the second network device, fifth resource configuration information, and determining the second search space based on the fifth resource configuration information, where the fifth resource configuration information includes at least one of information about a resource occupied by a control resource set in which the second search space is located, an identifier of the control resource set, and a first offset value, and the first offset value is determined based on the identifier of the control resource set.

In some possible implementations, that the first network device determines the first search space based on the third resource may be specifically: determining, by the first network device, third resource configuration information, and determining the first search space based on the third resource configuration information, where the third resource configuration information includes at least one of information about a resource occupied by a control resource set in which the first search space is located, an identifier of the first search space, and a second offset value, and the second offset value is determined based on the identifier of the first search space. Correspondingly, that the second network device determines the first search space based on the fourth resource may be specifically: determining, by the second network device, sixth resource configuration information, and determining the second search space based on the sixth resource configuration information, where the sixth resource configuration information includes at least one of information about a resource occupied by a control resource set in which the second search space is located, an identifier of the second search space, and a second offset value, and the second offset value is determined based on the identifier of the second search space.

In some possible implementations, the first network device may further send a notification message to the third network device, where the notification message is used to indicate the first resource configuration information or the second resource configuration information or the third resource configuration information. In other words, after determining the first resource configuration information, the first network device may further send, to the third network device, a notification message used to indicate the first resource configuration information, to notify the third network device of the first resource configuration information, so that the third network device determines a search space based on the first resource configuration information to obtain a downlink control channel. Further, after determining the second resource configuration information, the first network device may further send, to the third network device, a notification message used to indicate the second resource configuration information; and after determining the third resource configuration information, the first network device may further send, to the third network device, a notification message used to indicate the third resource configuration information. No more details are described herein. Further, the second network device may further send a notification message to the third network device, where the notification message is used to indicate the fourth resource configuration information or the fifth resource configuration information or the sixth resource configuration information.

In some possible implementations, the third resource may include a time domain resource; and the first network device may further send a notification message to the third network device, where the notification message includes an identifier of a second time element occupied by the first search space. Correspondingly, the second network device may further send a notification message to the third network device, where the notification message includes an identifier of a second time element occupied by the second search space.

In some possible implementations, the first network device may further send a first message to the third network device, where the first message is used to indicate a quantity of downlink control channels (and may further indicate a quantity of search spaces) to be sent, so that the third network device can receive a downlink control channel based on the quantity indicated in the first message, and stops blind detection after a quantity of received downlink control channels reaches the quantity indicated in the first message. This decreases blind detections and reduces device overheads. The first network device may further receive a second message sent by the third network device, where the second message is used to indicate a quantity of downlink control channels that the third network device can receive (and may further indicate a quantity of search spaces), so that the first network device can send a downlink control channel based on the quantity, where a quantity of downlink control channels sent by the first network device may not exceed the quantity indicated in the second message. Optionally, a value of the quantity indicated in the first message or the second message may be related to a receiving capability of the third network device or related to a current channel condition. A stronger receiving capability indicates a larger quantity, a better channel condition indicates a larger quantity, and so on. This is not limited in this application. Further optionally, the search space may be determined based on at least one of an aggregation level, a control information format, a control information size, and the quantity of search spaces. This can decrease blind detections and reduce system overheads.

In some possible implementations, the first network device may further determine the first search space based on a fourth parameter, where the first search space includes at least one control channel element CCE, and the fourth parameter may include a quantity of CCEs, a CCE identifier, or the like. Correspondingly, the second network device may further determine the second search space based on a fifth parameter, where the second search space includes at least one CCE, and the fifth parameter may include a quantity of CCEs, a CCE identifier, or the like.

According to a third aspect, this application further provides a network device, where the network device includes a determining module and a communications module, and the network device implements, by using the foregoing modules, some or all of the steps of the first network device in the channel transmission method according to the first aspect. The module may be software and/or hardware.

According to a fourth aspect, this application further provides a network device, where the network device includes a first determining module, a second determining module, a first communications module, and a second communications module, and the network device implements, by using the foregoing modules, some or all of the steps of the first network device or the second network device in the channel transmission method according to the second aspect. The module may be software and/or hardware.

According to a fifth aspect, this application further provides a computer storage medium, where the computer storage medium stores a program, and when the program is executed, some or all of the steps in the channel transmission method according to the first aspect are performed.

According to a sixth aspect, this application further provides a computer storage medium, where the computer storage medium stores a program, and when the program is executed, some or all of the steps in the channel transmission method according to the second aspect are performed.

According to a seventh aspect, this application further provides a network device, including a communications interface, a memory, and a processor, where the processor is connected to the communications interface and the memory;

the memory is configured to store a program instruction; and the processor is configured to invoke the program instruction in the memory, to perform some or all of the steps in the channel transmission method according to the first aspect.

According to an eighth aspect, this application further provides a network device, including a communications interface, a memory, and a processor, where the processor is connected to the communications interface and the memory;

the memory is configured to store a program instruction; and the processor is configured to invoke the program instruction in the memory, to perform some or all of the steps in the channel transmission method according to the second aspect.

According to a ninth aspect, this application further provides a channel transmission system, including a first network device and at least one second network device, where the first network device is configured to perform some or all of the steps in the channel transmission method according to the first aspect; and the second network device is configured to perform some or all of the steps in the channel transmission method according to the second aspect.

Another aspect of this application provides a computer program product that includes an instruction, where when the computer program product is run on a computer, the computer is enabled to perform the method in the foregoing aspects.

In the technical solutions provided in this application, a network device can determine that scheduled resources belong to search spaces of a plurality of downlink control channels, for example, PDCCHs, of one carrier, and further separately determine, in the search spaces, resources occupied by the plurality of PDCCHs, to transmit the plurality of PDCCHs by using the resources. In this way, one network device can receive a plurality of PDCCHs sent by one or more other network devices, and schedule data on one carrier through the plurality of PDCCHs. This improves information transmission efficiency and information transmission reliability.

BRIEF DESCRIPTION OF DRAWINGS

To describe the technical solutions in the embodiments of the present invention or in the background more clearly, the following describes the accompanying drawings required for describing the embodiments of the present invention or the background.

DESCRIPTION OF EMBODIMENTS

Figure 1:
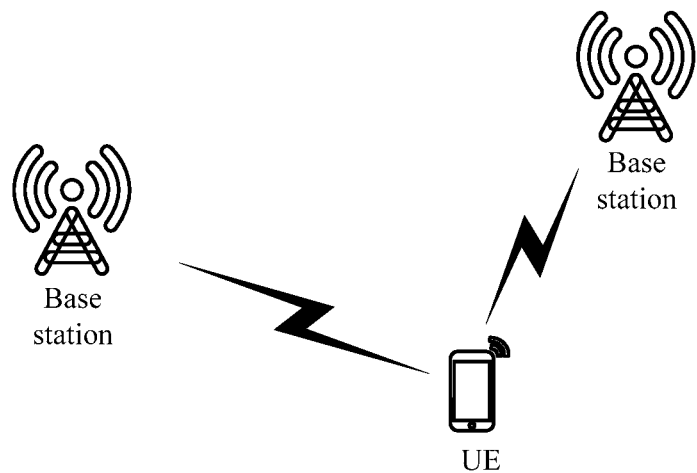
FIG. 1 is an architectural diagram of a communications system according to an embodiment of the present invention.

The following describes the embodiments of the present invention with reference to the accompanying drawings in the embodiments of the present invention.

It should be understood that the technical solutions of this application may be specifically applied to various communications systems, for example, a global system for mobile communications (Global System of Mobile communication, GSM for short), a code division multiple access (English: Code Division Multiple Access, CDMA for short) system, a wideband code division multiple access (English: Wideband Code Division Multiple Access, WCDMA for short), a time division-synchronous code division multiple access (English: Time Division-Synchronous Code Division Multiple Access, TD-SCDMA for short) system, a universal mobile telecommunication system (English: Universal Mobile Telecommunication System, UMTS for short), and a long term evolution (English: Long Term Evolution, LTE for short) system. As communications technologies develop continuously, the technical solutions of this application may be further used for future networks such as a fifth generation mobile communication technology (English: The Fifth Generation Mobile Communication Technology, 5G for short) system, which may also be referred to as an NR (English: New Radio, NR for short) system, or may be used for a D2D (device to device) system, an M2M (machine to machine) system, or the like.

This application is described with reference to a network device. The network device may be a base station or may be user equipment. For example, communication in this application may be performed between a base station and user equipment, may be performed between base stations, for example, between a macro base station and a small cell, or may be performed between user equipments, for example, communication in a D2D network.

In this application, user equipment (English: User Equipment, UE for short) may also be referred to as a terminal (terminal), a mobile console (English: Mobile Station, MS for short), a mobile terminal (mobile terminal), a subscriber unit (English: Subscriber Unit, SU for short), a subscriber station (English: Subscriber Station, SS for short), a mobile station (English: Mobile Station, MB for short), a remote station (English: Remote Station, RS for short), an access point (English: Access Point, AP for short), a remote terminal (English: Remote Terminal, RT for short), an access terminal (English: Access Terminal, AT for short), a user terminal (English: User Terminal, UT for short), a user agent (English: User Agent, UA for short), a terminal device (English: User Device, UD for short), user equipment (English: User Equipment, UE for short), or the like. This is not limited in this application. The user equipment may be a wireless terminal or a wired terminal. The wireless terminal may be a device providing voice and/or data connectivity for users and a handheld device having a wireless connection function or another processing device connected to a wireless modem. The wireless terminal may communicate with one or more core networks through a radio access network (for example, a RAN, radio access network). For example, the user equipment may be a mobile terminal, for example, a mobile phone (also referred to as a "cellular" phone) or a computer with a mobile terminal; or may be a portable, pocket-sized, handheld, computer built-in, or in-vehicle mobile apparatus, for example, a personal communications service (English: Personal Communication Service, PCS for short) phone, a cordless phone, a session initiation protocol (English: Session Initiation Protocol, SIP for short) phone, a wireless local loop (English: Wireless Local Loop, WLL for short) station, or a personal digital assistant (English: Personal Digital Assistant, PDA for short), which exchanges voice and/or data with a radio access network.

In this application, a base station may be a device that communicates with user equipment by using one or more sectors over an air interface in an access network. The base station may coordinate attribute management on the air interface. For example, the base station may be a GSM or CDMA base station, for example, a base transceiver station (base transceiver station, BTS for short); may be a WCDMA base station, for example, a NodeB; may be an LTE evolved base station, for example, an eNB or an e-NodeB (evolutional Node B); may be a base station in a 5G system, for example, a gNB, or a base station in a future network; or may be a transmission point (English: Transmission point, TP for short), a transmission and reception point (English: transmission and receiver point, TRP for short), a relay device, another network device having a base station function, or the like. This is not limited in this application.

A control channel in this application is mainly used to carry resource scheduling information and other control information. For example, the control channel may be a physical downlink control channel (English: Physical Downlink Control Channel, PDCCH for short), an enhanced physical downlink control channel (English: Enhanced Physical Downlink Control Channel, EPDCCH for short), a new radio physical downlink control channel (English: New Radio Physical Downlink Control Channel, NR-PDCCH for short), or another downlink channel with the foregoing function that is defined along with network evolution; or may be an uplink control channel, for example, a physical uplink control channel (Physical Uplink Control CHannel, PUCCH for short). A PDCCH is used as an example for description in this application. In this application, a channel may also be referred to as a signal or other names. This is not limited in this application.

In this application, a time element is an element corresponding to a time unit. The time unit is a time unit or a scheduling unit in time domain used for information transmission. The time element includes an integer quantity of symbols in time domain. For example, the time unit may be a subframe; may be a slot (slot); may be a radio frame, a mini-slot (mini slot or sub slot), an aggregated slot of a plurality of slots, an aggregated subframe of a plurality of subframes, a symbol, or the like; or may be a transmission time interval (English: Transmission Time Interval, TTI for short). This is not limited in this application. One or more time elements of a time unit may include an integer quantity of time elements of another time unit in time domain, or a length of one or more time elements of a time unit is equal to a total length of an integer quantity of time elements of another time unit in time domain. For example, one mini-slot/slot/subframe/radio frame includes an integer quantity of symbols, one slot/subframe/radio frame includes an integer quantity of mini-slots, one subframe/radio frame includes an integer quantity of slots, one radio frame includes an integer quantity of subframes, and the like. There may be other examples. This is not limited in this application.

The following describes an application scenario of this application. In this application, communication between a base station and UE is used as an example for description. FIG. 1 is an architectural diagram of a communications system according to an embodiment of the present invention. Specifically, as shown in FIG. 1, the communications system includes at least one base station (two base stations are shown in FIG. 1) and UE. The base station and the UE may communicate with each other by using various communications systems such as the 5G system, which may also be referred to as the NR system, in the foregoing wireless communications systems, and the LTE system, to implement information transmission.

During information transmission between the base station and the UE, the UE needs to listen to and attempt to decode all PDCCH candidate locations (candidate resources) in a time element such as a subframe. On the candidate resources, there are one or more PDCCHs that need to be listened to. In this application, a plurality of PDCCHs for same UE can be configured by using different PDCCH search spaces (Search Space) in a time element, or by using a same PDCCH search space in a time element. Optionally, the plurality of PDCCHs may be sent by using a same beam (that is, sent by using one beam), or may be sent by using different beams. Therefore, the UE can receive the plurality of PDCCHs and schedule data on one carrier through the plurality of received PDCCHs to transmit information. Each of the plurality of PDCCHs may include downlink scheduling information or may include uplink scheduling information. In this application, a PDCCH search space is composed of at least one CCE and may specifically include a total quantity of CCEs in a control region in a time element such as a subframe. A CCE is a basic unit of control channel resources. A CCE may be composed of one or more resource element groups (English: Resource Element Group, REG for short). A REG is composed of one or more resource elements REs. An RE is a basic resource unit. For example, an LTE RE is one subcarrier in frequency domain and one symbol in time domain. Further, a search space may include one or more PDCCH candidate resources, and the candidate resource may be related to an aggregation level. The aggregation level may specify a quantity of CCEs that transmit one PDCCH or a quantity of CCE resources on which one PDCCH is carried.

This application discloses a channel transmission method, a network device, and a system, to schedule data on one carrier through a plurality of downlink control channels, thereby improving information transmission efficiency and reliability. In this application, UE may separately determine that scheduled resources are resources occupied by at least two PDCCHs of one carrier in PDCCH search spaces, to obtain the at least two PDCCHs by using the resources. In this way, one UE can receive a plurality of PDCCHs. The scheduled resource may be a resource occupied by data scheduled on a downlink control channel. The following provides detailed description by using an example in which UE receives two PDCCHs, for example, receiving a first PDCCH sent by a first base station and a second PDCCH sent by a second base station.

Figure 2:
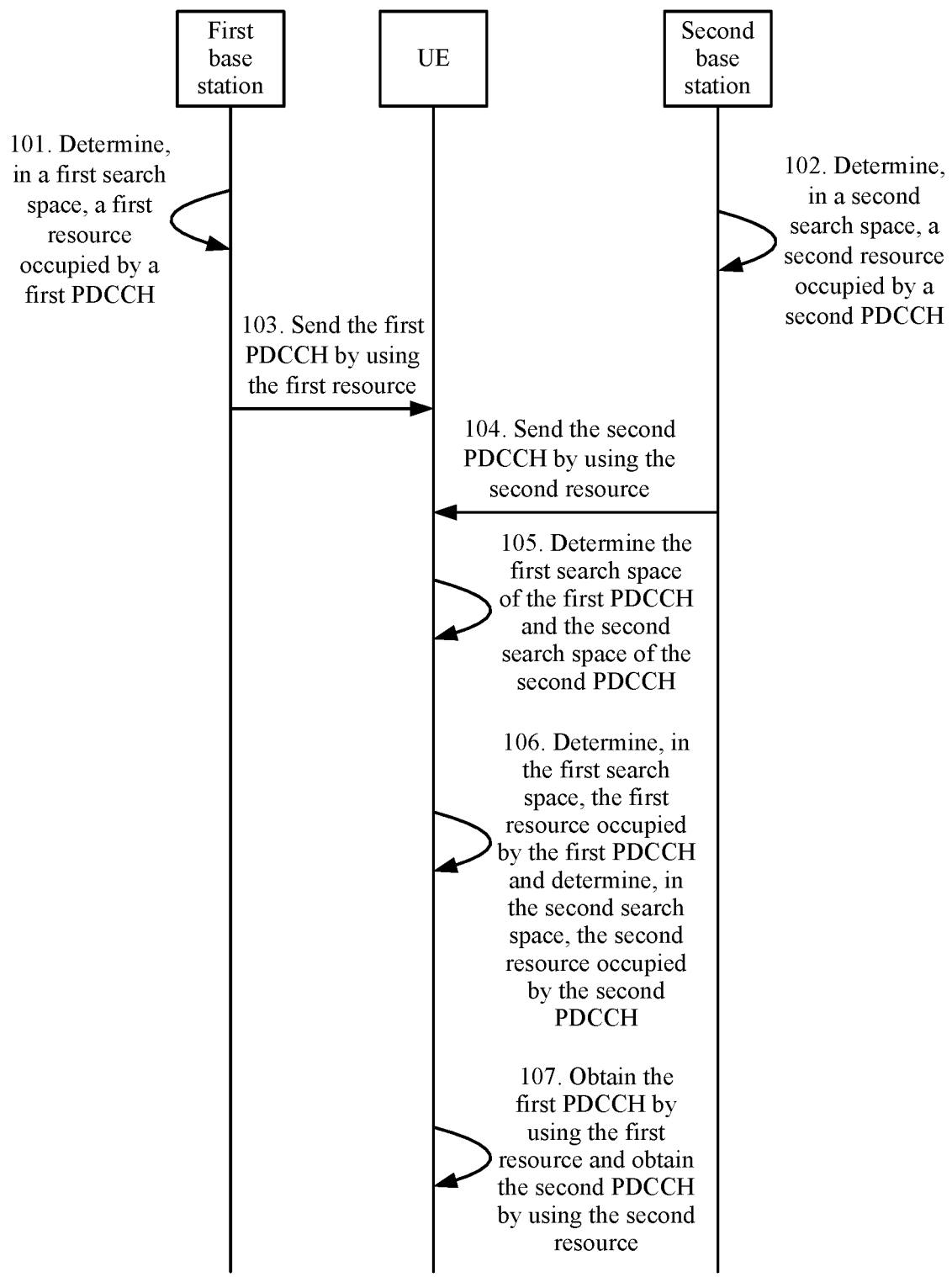
FIG. 2 is a schematic interaction diagram of a channel transmission method according to an embodiment of the present invention.

FIG. 2 is a schematic interaction diagram of a channel transmission method according to an embodiment of the present invention. Specifically, as shown in FIG. 2, the channel transmission method in this embodiment of the present invention includes the following steps.

101. A first base station determines, in a first search space, a first resource occupied by a first PDCCH.

102. A second base station determines, in a second search space, a second resource occupied by a second PDCCH, where the first search space is the same as the second search space.

A resource scheduled by the first PDCCH and a resource scheduled by the second PDCCH belong to one carrier. The scheduled resource may be a resource occupied by data scheduled on the PDCCH. Optionally, resources for transmitting the first PDCCH and the second PDCCH may be on one carrier, that is, on a same carrier, or may be on different carriers.

Optionally, the first base station and the second base station may be a same base station, that is, a same base station sends a plurality of PDCCHs to one UE; or the first base station and the second base station may be different base stations. Further optionally, a third base station, a fourth base station, and the like may exist in a system, and each base station may send one or more PDCCHs to the same UE, that is, one or more base stations send a plurality of PDCCHs to one UE. This is not limited in this embodiment of the present invention.

Optionally, before a plurality of base stations in the system send a plurality of PDCCHs to the UE, the plurality of base stations may first determine search spaces of the to-be-sent PDCCHs (also referred to as "PDCCH search spaces") and then determine, in the search spaces, resources occupied by the PDCCHs. That is, in this embodiment of the present invention, the first base station may determine the first PDCCH search space (namely, the first search space), and the second base station may determine the second PDCCH search space (namely, the second search space).

The search spaces of the plurality of PDCCHs may be the same or different. That is, the first PDCCH search space may be the same as or different from the second PDCCH search space.

Optionally, when the first PDCCH search space is the same as the second PDCCH search space, during determining of the first PDCCH search space, the first base station may determine the first PDCCH search space based on a first parameter, where the first parameter may include at least one of a quantity of CCEs, an identifier of a first time element, and a PDCCH candidate location. Correspondingly, when determining the second PDCCH search space, the second base station may also determine the first PDCCH search space based on the first parameter, where parameter values of the first parameter corresponding to the first base station and the first parameter corresponding to the second base station may be the same or different. In other words, a base station may determine a PDCCH search space based on parameters such as the quantity of CCEs, the identifier of the first time element, and the PDCCH candidate location. Further optionally, the quantity of CCEs may be a quantity of CCEs in the PDCCH search space or a quantity of CCEs included in a control resource set (control resource set) in which the PDCCH search space is located.

Specifically, before sending PDCCHs in a same search space of the UE, the base station may first determine the control resource set, namely, a resource location in which the PDCCH search space is located, including a time-frequency resource location. For example, in frequency domain, the resource location may be a section of bandwidth, or may be consecutive resource block (English: Resource Block, RB for short) resources or inconsecutive RB resources, or one or more subbands, or a subband part, or the like. In time domain, the resource location may be a quantity of time elements, for example, a quantity of symbols in a subframe, a slot, or a mini-slot (for example, the first several symbols by default), or may be an identifier of a time element, for example, one or more specific symbol locations. An RB is a unit of measuring a size of a time-frequency resource. For example, one LTE RB is 12 subcarriers in frequency domain and one slot in time domain. As systems develop continuously, an RB resource block may be redefined. This is not limited in this embodiment of the present invention. Therefore, the UE may determine the PDCCH search space and perform blind detection in the control resource set. There are a plurality of manners for the determining. The following manner is used as an example for description in this embodiment of the present invention.

The base station or the UE may determine a PDCCH search space $S_k^{(L)}$ according to the following formula:

$$L\{(Y_k+m') \bmod \lfloor N_{CCE,k}/L \rfloor\}+i$$

L is an aggregation level (Aggregation level), and a value of L may be 1, 2, 4, 8, or another value. L may represent a quantity of CCE resources used for transmitting the PDCCH. $N_{CCE,k}$ is a quantity of CCEs (Size) in a control region (that is, a control resource set) that is included in a time element k, for example, a subframe k; i=0, . . . , L−1, and m=0, . . . , $M^{(L)}$−1. $M^{(L)}$ is a quantity of PDCCH candidates that need to be listened to in a given search space, that is, a quantity of PDCCH candidates that need to be listened to. For example, a correspondence between L, $N_{CCE,k}$, and $M^{(L)}$ may be shown in Table 1.

TABLE 1

| | Search space $S_k^{(L)}$ | | |
|---|---|---|---|
| Type | Aggregation level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Specifically, PDCCH search spaces may be classified as common search spaces (Common) and user equipment-specific search spaces (UE-specific, namely, UE-specific search spaces). For the common search spaces, m'=m, and $Y_k$ is 0. For the UE-specific search spaces, $Y_k$ is defined as follows: $Y_k=(A \cdot Y_{k-1}) \bmod D$, where $Y_{-1}=n_{RNTI} \neq 0$, A=39827, D=65537, k=$\lfloor n_s/2 \rfloor$, and $n_s$ is a slot (slot) number (whose value range may be 0-19) in a radio frame. Optionally, the search space may be alternatively determined in other manners. This is not limited in this embodiment of the present invention.

In other words, to ensure that the first base station and the second base station, that is, a plurality of base stations, send PDCCHs in a same PDCCH search space of the UE, the plurality of base stations need to ensure that a total quantity of CCEs in a time unit (for example, a subframe, a slot, or a mini-slot) corresponding to the PDCCH search space is the same as that of CCEs in another time unit corresponding to the PDCCH search space, that is, quantities of CCEs in the search spaces are the same; and/or identifiers of time elements in same time domain for the plurality of base stations need to be the same; and/or it needs to be ensured that a plurality of to-be-sent PDCCHs are at different PDCCH candidate locations.

Figure 3:
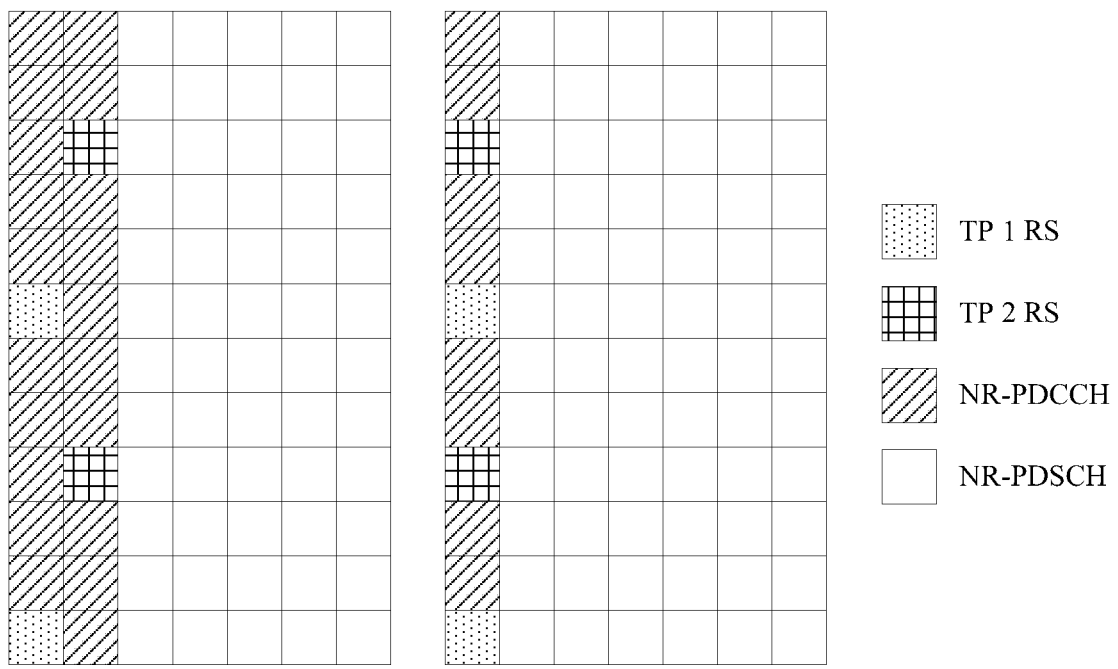
FIG. 3 is a schematic diagram of an RS configuration according to an embodiment of the present invention.

Specifically, a quantity of CCEs included in the first parameter corresponding to the first base station is the same as a quantity of CCEs included in the first parameter corresponding to the second base station. It is assumed that an allocated frequency domain resource is a full bandwidth, a partial bandwidth, a subband, or the like, and that frequency domain resources allocated to the first base station and the second base station are the same. When time elements, such as quantities of symbols, of the PDCCH search spaces (control regions) of the first base station and the second base station are the same, if there is no reference signal (English: Reference Signal, RS for short) in the symbols of the control regions, it can be ensured that quantities of the CCEs corresponding to the PDCCH search spaces are the same; and if there are RSs in the symbols of the control regions, but pilot patterns (pattern) or REs in the control regions are the same, it can be ensured that quantities of CCEs are the same. For example, code division may be performed for the RSs of the first base station and the second base station, and in this case, the first base station and the second base station need to notify the UE of specific pilot sequences, to be specific, notify the UE of two pilot sequences for a control resource set in which a PDCCH search space is located, so that the UE can estimate channel statuses of the two base stations based on the two pilot sequences, and then perform channel estimation to obtain a plurality of PDCCHs in the PDCCH search space through decoding. If there are RSs in symbols of the control regions and patterns or REs in the control regions are different, it can also be ensured that quantities of CCEs are the same. For example, time division or frequency division may be performed for the RSs of the first base station and the second base station, and in this case, the UE needs to be notified of specific RS locations, to be specific, notified of two RS patterns or REs for a control resource set in which a PDCCH search space is located, so that the UE can determine reference signal locations based on each RS pattern, and then perform channel estimation to obtain a plurality of PDCCHs in the PDCCH search space through decoding. As shown in FIG. 3, the left diagram is a time division solution, the right diagram is a frequency division solution, and RSs of base stations occupy different symbol locations. Optionally, the following two processing methods are used for RS locations of different base stations: The second base station sends no signal at RS locations of the first base station, which ensures that there is no interference between pilots of the base stations, thereby improving demodulation performance; or the second base station normally sends a signal at RS locations of the first base station, so that the UE can first decode RSs at the RS locations, eliminate the RSs later, and then decode a wanted signal, thereby improving information transmission reliability.

Further optionally, the first base station may further send an indication message to the second base station, where the indication message is used to indicate first time element information corresponding to the first PDCCH; the second base station may further send an indication message to the first base station, to indicate second time element information corresponding to the second PDCCH; the first base station receives the second time element information sent by the second base station, where the second time element information is time element information corresponding to the second PDCCH; the first base station may determine, based on the first time element information and the second time element information, a quantity of CCEs corresponding to the first PDCCH search space; and the second base station may determine, based on the first time element information and the second time element information, a quantity of CCEs corresponding to the second PDCCH search space. The first time element information or the second time element information includes a quantity of second time elements or an identifier of a second time element.

Optionally, a message in this embodiment of the present invention, such as the indication message, may be higher-layer information, for example, a system message, radio resource control (English: Radio Resource Control, RRC for short) signaling, or medium access control (English: Medium Access Control, MAC for short) signaling. Alternatively, optionally, the indication message may be physical layer signaling, for example, physical layer downlink control information (English: Downlink Control Information, DCI for short), or the like. This is not limited in this embodiment of the present invention.

In other words, when quantities of symbols in PDCCH search spaces (control regions) of the first base station and the second base station are different, the base stations may exchange their time element information such as respective quantities of symbols or symbol identifiers, to ensure that total quantities of CCEs allocated to the UE are the same. For example, the first base station and the second base station may use a smaller one of the quantities of symbols of the two base stations, as a quantity of symbols for determining a quantity of CCEs.

Optionally, for uniform understanding of a rule of an identifier of a time element for the plurality of base stations, an identifier of a time element of the first PDCCH or an identifier of a time element of the second PDCCH may be determined based on a subcarrier spacing of the first resource and a subcarrier spacing of the second resource. Alternatively, an identifier of a time element of the first PDCCH may be determined based on an identifier of a time element, corresponding to the time element of the first PDCCH, among time elements corresponding to a preset subcarrier spacing, and an identifier of a time element of the second PDCCH is determined based on an identifier of a time element, corresponding to the time element of the second PDCCH, among the time elements corresponding to the preset subcarrier spacing. Therefore, it can be ensured that identifiers of time elements in same time domain are the same for the plurality of base stations, that is, a plurality of coordinated base stations in a channel transmission system.

Figure 4:
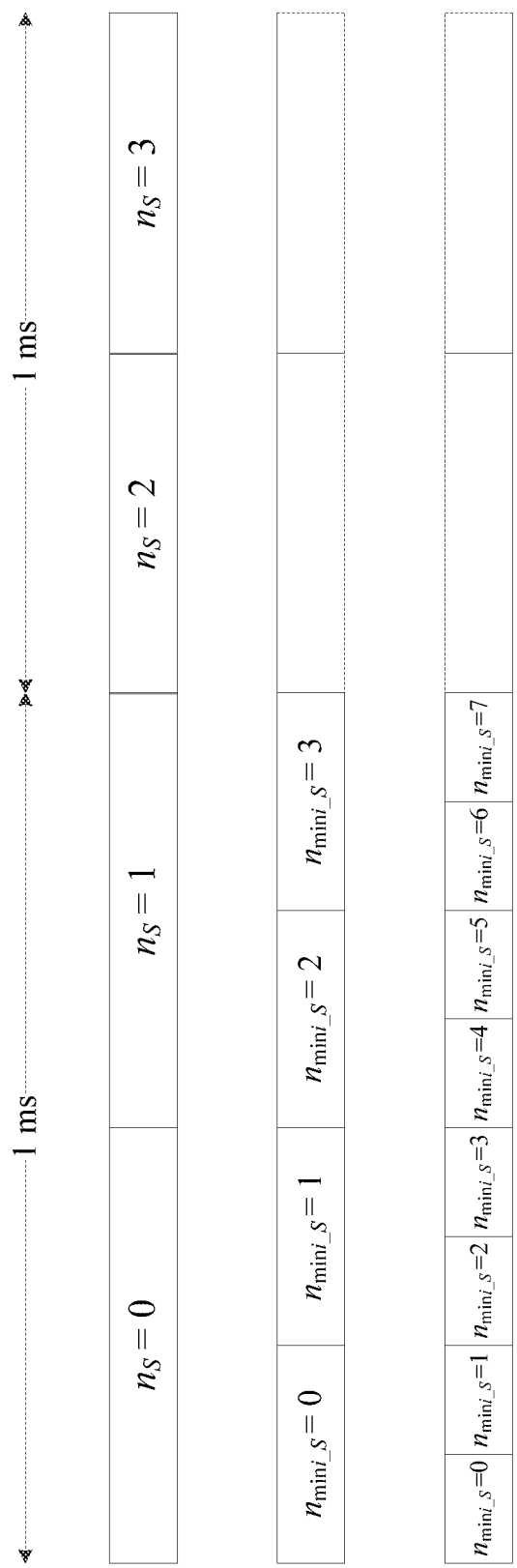
FIG. 4 is a schematic diagram of subframes based on different subcarrier spacings according to an embodiment of the present invention.

Specifically, different base stations may use different frame structures in different subframes, and the frame structure is related to a subcarrier spacing. FIG. 4 is a schematic diagram of subframes corresponding to a 15 kHz subcarrier spacing, a 30 kHz subcarrier spacing, and a 60 kHz subcarrier spacing. Therefore, during determining of the identifier of the time element, for example, a slot number, in the control region, slot numbers corresponding to each subcarrier spacing may be used. Time domain lengths corresponding to different subcarrier spacings are proportional, and therefore the following same processing may be performed for slot numbers corresponding to the different subcarrier spacings: For example, if a subcarrier spacing is 15 kHz, a time variable is $k=\lfloor n_s/2 \rfloor$; if a subcarrier spacing is 15*2n kHz, a time variable is $k=\lfloor n_s/(2n) \rfloor$; and if a subcarrier spacing is $15*2^n$ kHz, a time variable is $k=\lfloor n_s/2^n \rfloor$, where $n_s$ may be a slot number or a mini-slot number. Alternatively, during determining of a slot number, a slot number corresponding to a preset subcarrier spacing, for example, a 15 kHz subcarrier spacing, may be directly used; and if one slot includes a plurality of mini-slots, the search space may be determined based on a mini-slot number ($n_{mini\_s}$) corresponding to the 15 kHz subcarrier spacing.

Further optionally, the first base station may further send the first parameter to the UE, and the second base station may further send the first parameter to the UE, so that the UE quickly determines the search space of the PDCCH that needs to be received.

Optionally, a candidate location of the first PDCCH is different from a candidate location of the second PDCCH, the candidate location of the first PDCCH or the candidate location of the second PDCCH is determined based on a candidate location parameter, that is, a second parameter, and the second parameter may include at least one of a base station type, a base station identifier, and an aggregation level.

Specifically, to ensure that different base stations send PDCCHs in the same PDCCH search space of the UE, the first base station and the second base station further need to ensure, through decision, that the PDCCHs are not sent at a same candidate location. Optionally, an REG-to-CCE mapping and a CCE-to-search space candidate mapping may be exchanged between or predefined by the first base station and the second base station. Each CCE may include four to eight REGs or other quantities of REGs. The REG-to-CCE mapping may be localized mapping or distributed mapping. The REG-to-CCE mapping may be in a frequency-first, time-second manner, or may be in a time-first, frequency-second manner. The CCE-to-search space mapping may be in a frequency-first, time-second manner, or may be in a time-first, frequency-second manner. This is not limited in this embodiment of the present invention.

Figure 5A:
FIG. 5a is a schematic structural diagram of candidate locations according to an embodiment of the present invention.
Figure 5B:
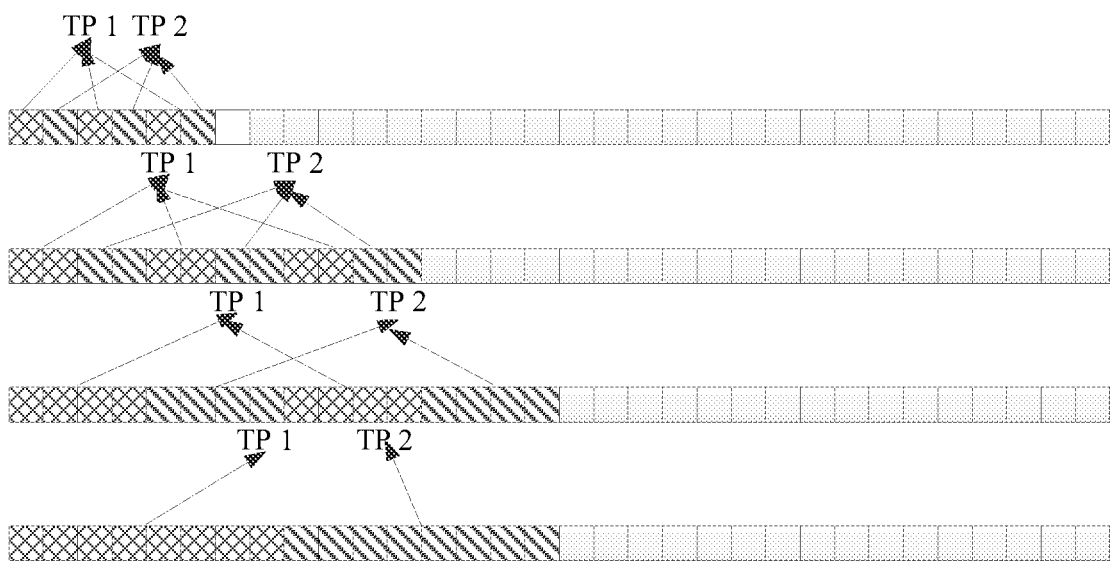
FIG. 5b is another schematic structural diagram of candidate locations according to an embodiment of the present invention.
Figure 5C:
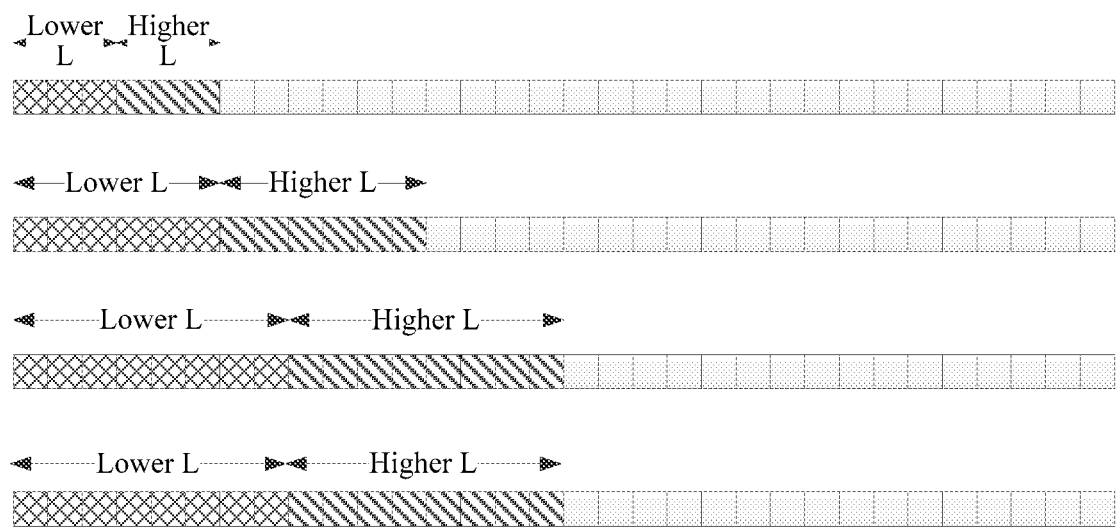
FIG. 5c is still another schematic structural diagram of candidate locations according to an embodiment of the present invention.

Further, an aggregation level of the first PDCCH and an aggregation level of the second PDCCH may be the same or may be different. When the aggregation levels of the two PDCCHs are the same, the base stations may determine, in a predefined manner or through interaction between the base stations, candidate spaces (candidate locations) occupied by the base stations. For example, it can be predefined as follows: The first base station (a TP1, for example, a serving base station) occupies the first half, and the second base station (a TP2, for example, a coordinated base station) occupies the second half, as shown in FIG. 5a; or it can be predefined as a crossed manner: The first base station occupies candidates 1, 3, and 5, and the second base station occupies candidates 2, 4, and 6, as shown in FIG. 5b. Alternatively, determining may be performed based on a base station number (for example, a number of the first base station is 0, and a number of the second base station is 1): A smaller number uses the first half, and a larger number uses the second half. Alternatively, the base stations may exchange candidate spaces used. When the aggregation levels of the two PDCCHs are different, it may be predefined that a lower aggregation level (Lower L) uses a first half candidate space, and a higher aggregation level (Higher L) uses a second half candidate space, as shown in FIG. 5c; or it may be predefined that a lower aggregation level uses a second half candidate space, and a higher aggregation level uses a first half candidate space; or the base stations may exchange candidate spaces used by the base stations; or the like. A higher/lower aggregation level L is exchanged between the base stations or predefined by the base stations. For example, it may be predefined that L=1 and 2 represents the lower aggregation level, and L=4 and 8 represents the higher aggregation level; or it may be predefined that L=1, 2, and 4 represents the lower aggregation level, and L=8, 16, and 32 is the higher aggregation level; or the like. Further optionally, if channel characteristics of the two base stations are greatly different, the base stations may notify the UE in advance that the aggregation levels of the two PDCCHs are different. A square box in FIG. 5a or FIG. 5b or FIG. 5c may represent one CCE.

Further optionally, the first base station and the second base station may further send the second parameter to the UE, to notify the UE of parameters of the first base station and the second base station such as base station types, base station identifiers, and aggregation levels. Therefore, when the UE performs blind detection based on the parameters such as the base station types, the base station identifiers, and the aggregation levels, after the UE detects one PDCCH, a blind detection scope for the other PDCCH may be reduced, so that fewer blind detections are performed, and UE overheads are reduced.

103. The first base station sends the first PDCCH to the UE by using the first resource.

104. The second base station sends the second PDCCH to the UE by using the second resource.

The first resource may be a time-frequency domain resource (a time domain resource and/or a frequency domain resource), or may be a code division resource. Optionally, the first PDCCH and the second PDCCH may be sent through a same beam, or may be sent through different beams. This is not limited in this embodiment of the present invention.

Further optionally, the one or more base stations may further notify the UE of a quantity of PDCCHs that need to be received or a quantity of search spaces, so that the UE receives PDCCHs based on the quantity (where a quantity of received PDCCHs does not exceed the notified quantity); or the plurality of base stations may receive a message used to indicate a quantity of PDCCHs that can be received or a quantity of search spaces checked that is sent by the UE, so that the base stations send PDCCHs based on the quantity (where a quantity of sent PDCCHs does not exceed the quantity indicated in the message). Further, the plurality of base stations may perform interaction based on the quantity, to determine a quantity of PDCCHs sent by each base station and then configure PDCCH search spaces, thereby decreasing blind detections of the UE, reducing UE overheads, and improving PDCCH transmission reliability.

105. The UE determines the first search space of the first PDCCH and the second search space of the second PDCCH.

106. The UE determines, in the first search space, the first resource occupied by the first PDCCH and determines, in the second search space, the second resource occupied by the second PDCCH.

Specifically, when determining the PDCCH search space, the UE may determine a control resource set control resource set in which the PDCCH search space is located. The control resource set is a resource location, including a time-frequency resource location, for transmitting a control channel. For example, in frequency domain, the resource location may be a full bandwidth, or may be consecutive RB resources or inconsecutive RB resources, or one or more subbands, or a subband part, or the like. In time domain, the resource location may be a quantity of symbols (for example, first several symbols by default) in a time element such as a subframe, a slot, or a mini-slot, or may be one or more specific symbol locations. The UE may then determine the PDCCH search space and perform blind detection in the control resource set. Optionally, after determining the control resource set, the base station may further send configuration information of the control resource set to the UE, to indicate a location of the control resource set. The UE may receive the configuration information to determine the control resource set; or the control resource set may be predefined.

Optionally, when determining the PDCCH search spaces of the at least two PDCCHs, for example, the first PDCCH search space and the second PDCCH search space, the UE may determine the first PDCCH search space and the second PDCCH search space based on the first parameter, where the first parameter may include at least one of a quantity of CCEs, an identifier of a first time element, and a PDCCH candidate location. Optionally, the first parameter may be sent to the UE by at least one base station, for example, the UE may receive the first parameter sent by the first base station for indicating the first PDCCH search space, and the UE may further receive the first parameter sent by the second base station for indicating the second PDCCH search space; or the first parameter may be determined by the UE according to a preset rule; or the first parameter may be determined by the base station and the UE through advance negotiation. This is not limited in this embodiment of the present invention.

Optionally, to ensure that the first PDCCH search space is the same as the second PDCCH search space, a quantity of CCEs of the first PDCCH search space is the same as a quantity of CCEs of the second PDCCH search space; or an identifier of a time element of the first PDCCH and an identifier of a time element of the second PDCCH are determined based on a subcarrier spacing of the resource occupied by the first PDCCH and a subcarrier spacing of the resource occupied by the second PDCCH, respectively; or an identifier of a time element of the first PDCCH may be determined based on an identifier of a time element, corresponding to the time element of the first PDCCH, among time elements corresponding to a preset subcarrier spacing, and an identifier of a time element of the second PDCCH is determined based on an identifier of a time element, corresponding to the time element of the second PDCCH, among the time elements corresponding to the preset subcarrier spacing; or a candidate location of the first PDCCH is different from a candidate location of the second PDCCH, where the candidate location may be determined based on a candidate location parameter, that is, the second parameter, and the second parameter may include at least one of a base station type, a base station identifier, and an aggregation level.

Specifically, the candidate location of the first PDCCH is different from the candidate location of the second PDCCH, and therefore the UE may perform blind detection based on a candidate location of each PDCCH. For example, in the half-half division solution shown in FIG. 5a or FIG. 5c, if the UE detects a PDCCH in the first half, next, the UE may perform detection in only the second half candidate region; and if the UE detects a PDCCH in the second half, next, the UE may perform detection in only the first half candidate region. For another example, in the crossed division solution shown in FIG. 5b, if the UE detects a PDCCH in the first, third, fifth . . . candidate regions, next, the UE may perform detection in only the second, fourth, sixth . . . candidate regions. For still another example, for a lower aggregation level, the UE may perform detection in only the first half search space candidate; and for a higher aggregation level, the UE may perform detection in only the second half search space candidate. For yet another example, when aggregation levels of two PDCCH search spaces are the same, the UE may perform detection based on a base station number (for example, a number of the first base station is 0, and a number of the second base station is 1): perform detection in the first half for the smaller number and perform detection in the second half for the larger number; or the like. In this way, when the UE performs blind detection, after the UE detects one PDCCH, a blind detection scope for the other PDCCH can be reduced, so that fewer blind detections are performed, and UE overheads are reduced.

107. The UE obtains the first PDCCH by using the first resource and obtains the second PDCCH by using the second resource.

Optionally, a maximum quantity of blind detections may be set, and when the maximum quantity of blind detections is reached, the UE stops blind detection. In this way, blind detections can be further decreased, and UE overheads can be reduced. Optionally, the maximum quantity of blind detections may be predefined in a protocol, or customized by the UE, or notified by the base station, or the like. This is not limited in this embodiment of the present invention.

Further optionally, the search space may be determined based on at least one of an aggregation level, a quantity of PDCCHs, a control information format, a control information size, and a quantity of search spaces. For example, the aggregation level, the quantity of PDCCHs, the control information format, the control information size, and the quantity of search spaces may be notified by the base station to the UE, for example, notified to the UE when the base station determines the control resource set (for example, carried in the configuration information of the control resource set). The control information may be control information carried on a downlink control channel, for example, the PDCCH in this embodiment of the present invention. The control information may be, for example, DCI.

For example, the first base station or the second base station may notify the UE of one or more aggregation levels when configuring (determining) the control resource set. For example, the first base station or the second base station may configure an aggregation level to 4, and the UE detects only a candidate corresponding to the aggregation level 4 during monitoring; or the first base station or the second base station may configure a plurality of aggregation levels such as 4, 8, and 16, and the UE detects only candidates corresponding to the indicated aggregation levels during monitoring. In this way, fewer blind detections are performed.

For another example, the first base station or the second base station may notify the UE of a quantity of PDCCHs that need to be monitored for the control resource set. For example, if the UE is configured to monitor one PDCCH, the UE stops monitoring after one PDCCH is detected or the maximum quantity of blind detections is reached; and if the UE is configured to monitor two PDCCHs, the UE stops monitoring after two PDCCHs are detected or the maximum quantity of blind detections is reached.

For still another example, the first base station or the second base station may notify the UE of a quantity of PDCCHs that need to be monitored for the control resource set and a corresponding aggregation level. For example, if it is configured that the UE detects one PDCCH and that a corresponding aggregation level is 4, the UE performs monitoring only on a candidate corresponding to the aggregation level 4, and the UE stops the monitoring after one PDCCH is detected or the maximum quantity of blind detections is reached; or if it is configured that the UE detects one PDCCH and that corresponding aggregation levels are a plurality of aggregation levels such as 4, 8, and 16, the UE performs monitoring only on candidates corresponding to the indicated aggregation levels, and the UE stops the monitoring after one PDCCH is detected or the maximum quantity of blind detections is reached; or if the first base station or the second base station may configure that the UE detects two PDCCHs and that aggregation levels corresponding to the two PDCCHs are the same, for example, the corresponding aggregation levels are 4, the UE may perform monitoring only on candidates corresponding to the aggregation level 4, and the UE stops the monitoring after two PDCCHs are detected or the maximum quantity of blind detections is reached; or if it is configured that the UE detects two PDCCHs and that aggregation levels corresponding to the two PDCCHs are the same, for example, the corresponding aggregation levels are a plurality of aggregation levels such as 4, 8, and 16, the UE performs monitoring only on candidates corresponding to the indicated aggregation levels, and the UE stops monitoring after two PDCCHs are detected or the maximum quantity of blind detections is reached; or if the first base station or the second base station may configure that the UE detects two PDCCHs and that aggregation levels corresponding to the two PDCCHs are different, for example, an aggregation level corresponding to the first PDCCH is 4 and an aggregation level corresponding to the second PDCCH is 8, the UE performs monitoring only on a candidate corresponding to the aggregation level 4 for the first PDCCH, and after one PDCCH is detected or the maximum quantity of blind detections is reached, the UE performs monitoring only on a candidate corresponding to the aggregation level 8 for the second PDCCH, and stops the monitoring after one PDCCH is detected or the maximum quantity of blind detections is reached, where a detection order of the first PDCCH and the second PDCCH may not be limited. Alternatively, if the first base station or the second base station may configure that the UE detects two PDCCHs and that aggregation levels corresponding to the two PDCCHs are different, for example, aggregation levels corresponding to the first PDCCH are a plurality of aggregation levels such as 4, 8, and 16 and aggregation levels corresponding to the second PDCCH are a plurality of aggregation levels such as 8, 16, and 32, the UE may perform monitoring only on candidates corresponding to the indicated aggregation levels such as 4, 8, and 16 for the first PDCCH, and after one PDCCH is detected or the maximum quantity of blind detections is reached, the UE performs monitoring only on candidates corresponding to the indicated aggregation levels such as 8, 16, and 32 for the second PDCCH, and stops the monitoring after one PDCCH is detected or the maximum quantity of blind detections is reached, where a detection order of the first PDCCH and the second PDCCH may not be limited, and they may be detected simultaneously. For example, when aggregation levels of the two PDCCHs are the same, detection may be performed on the two PDCCHs simultaneously. This is not limited in this embodiment of the present invention.

Further optionally, the first base station or the second base station may further notify the UE of at least one of a control information format or a control information size for the control resource set. For example, it is configured that the UE detects a PDCCH for which a control information format is DCI format 2D or a control information size is A, where a value of A may be 20 bits, 40 bits, or another value. Optionally, the first base station or the second base station may configure information about a plurality of control information quantities or a plurality of control information sizes for a plurality of search spaces or a plurality of PDCCHs, or configure information about one control information quantity or one control information size for a plurality of search spaces or a plurality of PDCCHs, or configure information about a plurality of control information quantities or a plurality of control information sizes for one search space or one PDCCH, or the control information quantity or the control information size is predefined. This is not limited in this embodiment of the present invention. In this way, the UE can quickly perform PDCCH detection and decoding.

Further optionally, the first base station or the second base station may further notify the UE of a quantity of search spaces for the control resource set, where one search space may include one or more PDCCHs. Further, the first base station or the second base station may further notify a quantity of PDCCHs for a search space and a corresponding aggregation level, control information format, control information size, and the like. For details, refer to the foregoing description. No more details are described herein.

In other words, after determining a search space of each PDCCH, the UE may perform blind detection in the search space, and further determine, in the search space, a resource occupied by the PDCCH, to obtain the PDCCH by using the resource.

In this embodiment of the present invention, a plurality of base stations can send a plurality of PDCCHs to the UE in a same PDCCH search space of the UE, so that the UE can receive the plurality of PDCCHs and schedule data on one carrier through the plurality of PDCCHs. This improves information transmission efficiency and information transmission reliability. In this embodiment of the present invention, search space candidates of the plurality of PDCCHs are designed, and CCEs of the plurality of PDCCHs are designed to be not overlapped. This resolves a prior-art problem that transmission of a plurality of PDCCHs cannot be supported, decreases blind detections of the UE, and improves blind detection efficiency of the UE.

Figure 6:
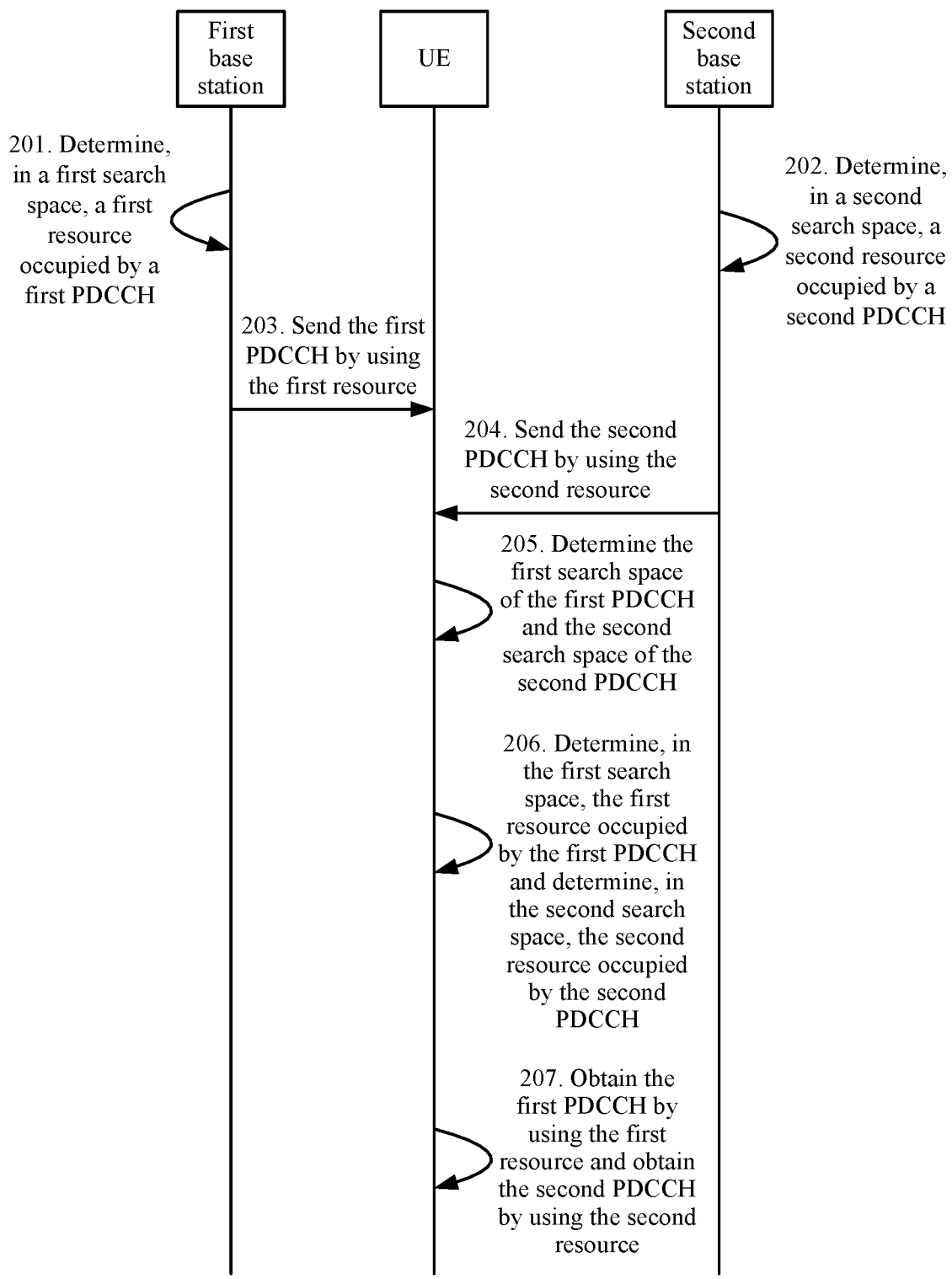
FIG. 6 is a schematic interaction diagram of another channel transmission method according to an embodiment of the present invention.

FIG. 6 is a schematic interaction diagram of another channel transmission method according to an embodiment of the present invention. Specifically, as shown in FIG. 6, the channel transmission method in this embodiment of the present invention includes the following steps.

201. A first base station determines, in a first search space, a first resource occupied by a first PDCCH.

202. A second base station determines, in a second search space, a second resource occupied by a second PDCCH, where the first search space is different from the second search space.

A resource scheduled by the first PDCCH and a resource scheduled by the second PDCCH belong to one carrier. The scheduled resource may be a resource occupied by data scheduled on the PDCCH. Optionally, resources for transmitting the first PDCCH and the second PDCCH may be on one carrier, that is, on a same carrier, or may be on different carriers.

Optionally, before a plurality of base stations in a communications system send a plurality of PDCCHs to UE, the plurality of base stations may first determine search spaces of the to-be-sent PDCCHs and then determine, in the search spaces, resources occupied by the PDCCHs. That is, in this embodiment of the present invention, the first base station may determine the first PDCCH search space (namely, the first search space), and the second base station may determine the second PDCCH search space (namely, the second search space).

The search spaces of the plurality of PDCCHs may be the same or different. That is, the first PDCCH search space may be the same as or different from the second PDCCH search space.

Optionally, when the first PDCCH search space is different from the second PDCCH search space, during determining of the first PDCCH search space, the first base station may determine a third resource occupied by the first PDCCH search space and determine the first PDCCH search space based on the third resource. Correspondingly, during determining of the second PDCCH search space, the second base station may determine a fourth resource occupied by the second PDCCH search space and determine the second PDCCH search space based on the fourth resource. A resource occupied by the PDCCH search space, that is, the third resource and/or the fourth resource, may include a frequency domain resource or a time domain resource. Therefore, different PDCCHs can be sent on different time domain resources or frequency domain resource, and the UE can receive a plurality of PDCCHs.

Figure 7:
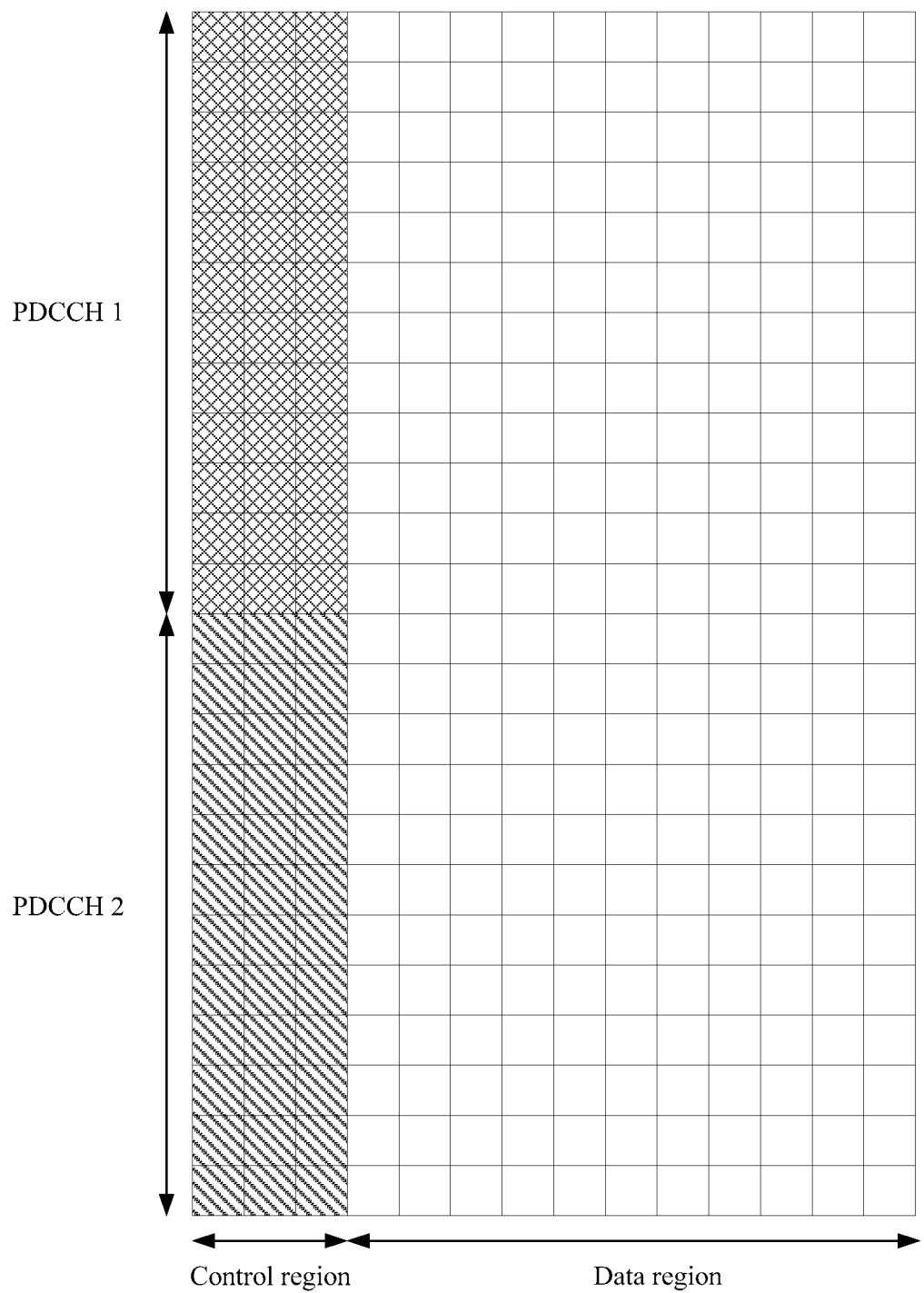
FIG. 7 is a schematic diagram of a search space configuration based on frequency division according to an embodiment of the present invention.

Further optionally, when the first PDCCH search space is different from the second PDCCH search space, the first PDCCH and the second PDCCH may be differentiated based on frequency domain resources. For example, the first PDCCH search space and the second PDCCH search space may occupy different frequency domain resources, as shown in FIG. 7.

In an optional implementation, when determining the first PDCCH search space based on the third resource, the first base station may determine first resource configuration information and determine the first PDCCH search space based on the first resource configuration information, where the first resource configuration information may include information about a resource occupied by a control resource set in which the first PDCCH search space is located. Correspondingly, when determining the second PDCCH search space based on the fourth resource, the second base station may determine fourth resource configuration information and determine the second PDCCH search space based on the fourth resource configuration information, where the fourth resource configuration information includes information about a resource occupied by a control resource set in which the second PDCCH search space is located. Further optionally, the first resource configuration information and/or the fourth resource configuration information may further include the CCE identifier, for example, CCE number information.

Further optionally, the first base station may further send the first notification message to the UE, where the first notification message is used to indicate the first resource configuration information; and the second base station may further send the fourth notification message to the UE, where the fourth notification message is used to indicate the fourth resource configuration information. Therefore, the UE can determine the two PDCCH search spaces based on the first resource configuration information and the fourth resource configuration information. Further, the first notification message or the fourth notification message may be sent to the UE by the first base station or the second base station when the first base station or the second base station configures the control resource set. For example, the first resource configuration information or the fourth resource configuration information may be carried in configuration information of the control resource set and sent to the UE. The configuration information of the control resource set may further include information such as a quantity of PDCCHs, a quantity of search spaces, an aggregation level, a control information format, and a control information size. For a specific configuration method, refer to the foregoing embodiment. No more details are described herein.

Figure 8A:
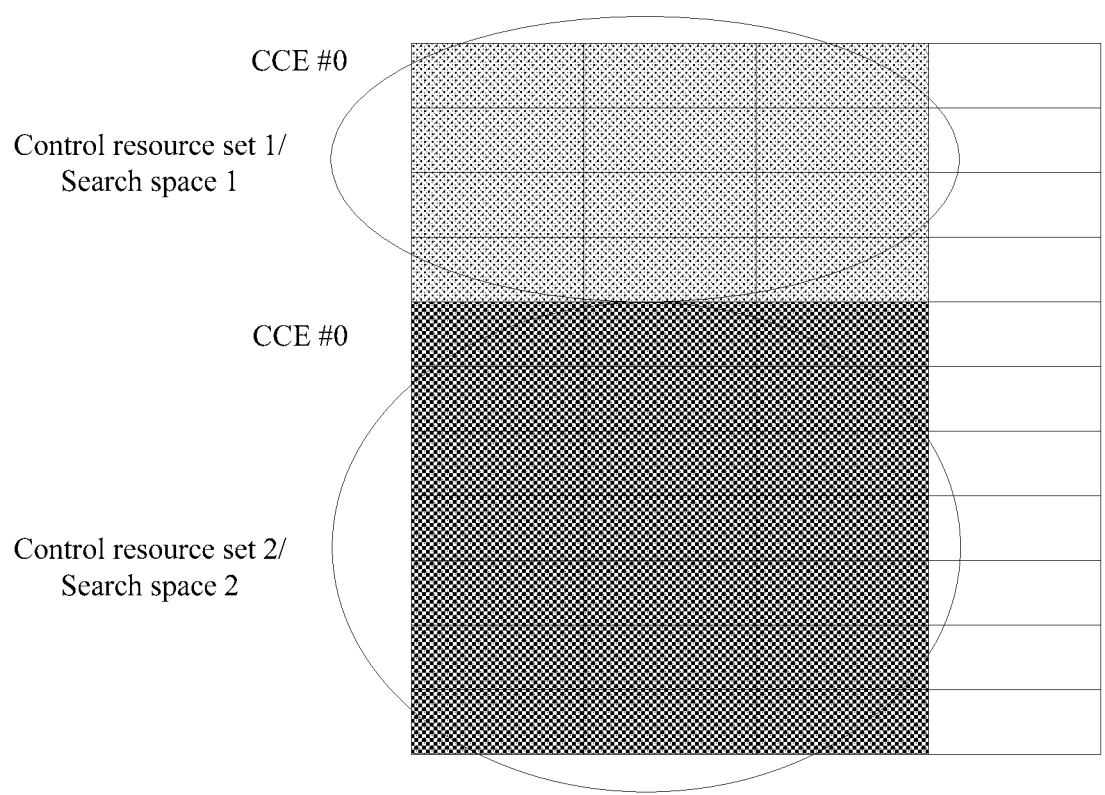
FIG. 8a is a schematic structural diagram of control resource sets and search spaces according to an embodiment of the present invention.

Specifically, the first PDCCH search space and the second PDCCH search space may be located in two control resource sets, and frequency domain resources of the two sets do not overlap, that is, the control resource sets in which the two PDCCH search spaces are located are different. Further, CCEs of each set may be numbered, for example, starting from 0. As shown in FIG. 8a, the first base station sends a PDCCH (search space 1) in a control resource set 1 (control resource set 1), and the second base station sends a PDCCH (search space 2) in a control resource set 2 (control resource set 2). Therefore, the UE may calculate search space locations based on the numbers and perform blind detection on search space candidates. Alternatively, CCEs in the two control resource sets may be jointly numbered. No limitation is imposed on a quantity of control resource sets and a CCE numbering manner in this embodiment of the present invention.

In an optional implementation, when determining the first PDCCH search space based on the third resource, the first base station may determine second resource configuration information and determine the first PDCCH search space based on the second resource configuration information, where the second resource configuration information may include at least one of information about a resource occupied by a control resource set in which the first PDCCH search space is located, an identifier of the control resource set, and a first offset value, and the first offset value may be determined based on the identifier of the control resource set. Correspondingly, when determining the second PDCCH search space based on the fourth resource, the second base station may determine fifth resource configuration information and determine the second PDCCH search space based on the fifth resource configuration information, where the fifth resource configuration information includes at least one of information about a resource occupied by a control resource set in which the second PDCCH search space is located, an identifier of the control resource set, and the first offset value, and the first offset value may be determined based on the identifier of the control resource set. Further optionally, the second resource configuration information and/or the fifth resource configuration information may further include the CCE identifier, for example, CCE number information.

Further optionally, the first base station may further send the second notification message to the UE, where the second notification message is used to indicate the second resource configuration information; and the second base station may further send the fifth notification message to the UE, where the fifth notification message is used to indicate the fifth resource configuration information. Therefore, the UE can determine the two PDCCH search spaces based on the second resource configuration information and the fifth resource configuration information. Further, the second notification message or the fifth notification message may be sent to the UE by the first base station or the second base station when the first base station or the second base station configures the control resource set. For example, the second resource configuration information or the fifth resource configuration information may be carried in configuration information of the control resource set and sent to the UE. The configuration information of the control resource set may further include information such as a quantity of PDCCHs, a quantity of search spaces, an aggregation level, a control information format, and a control information size. For a specific configuration method, refer to the foregoing embodiment. No more details are described herein.

Figure 8B:
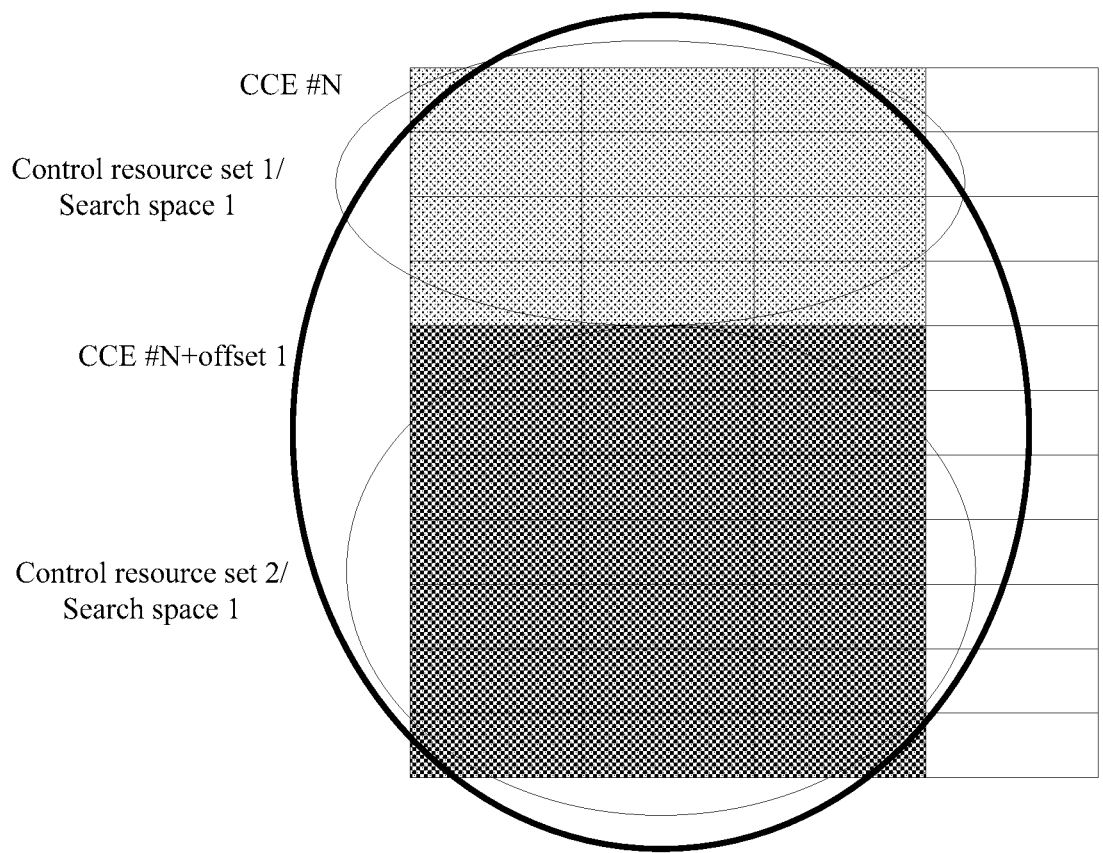
FIG. 8b is another schematic structural diagram of control resource sets and search spaces according to an embodiment of the present invention.

Specifically, the first PDCCH search space and the second PDCCH search space may be located in two control resource sets, that is, a control resource set 1 (control resource set 1) and a control resource set 2 (control resource set 2), and resources of the two sets may completely overlap. Further, a CCE number of the PDCCH search space may be related to a set number. For example, one first offset value offset 1 may be configured, and a CCE number of the first PDCCH search space corresponding to the first set may be determined according to a formula, and a CCE number of the PDCCH search space corresponding to the second set may increase by the value offset 1. For example, if a CCE number of the first set is 1, a calculated CCE number of the second set may be 1+offset 1. Offset 1 may be a fixed value or may be notified to the UE by the base station through signaling. For example, offset 1 may be an integer such as 8, 16, 32, or 64. Further, offset 1 may be alternatively determined based on the set number. For example, offset 1=N*M, where N is a set number, and M is an offset difference which is an integer such as 8, 16, 32, or 64. As shown in FIG. 8b, the largest circle indicates a resource location of the control resource set 1, which is also a resource location of the control resource set 2; the circle above indicates a CCE location of a search space of the control resource set 1 (a search space 1), that is, the first PDCCH search space; and the circle below indicates a CCE location of a search space of the control resource set 2 (the search space 1), that is, the second PDCCH search space, and a CCE number increases by the value offset 1.

In an optional implementation, when determining the first PDCCH search space based on the third resource, the first base station may determine third resource configuration information and determine the first PDCCH search space based on the third resource configuration information, where the third resource configuration information includes at least one of information about a resource occupied by a control resource set in which the first PDCCH search space is located, an identifier of the first PDCCH search space, and a second offset value, and the second offset value is determined based on the identifier of the first PDCCH search space. Correspondingly, when determining the second PDCCH search space based on the fourth resource, the second base station may determine sixth resource configuration information and determine the second PDCCH search space based on the sixth resource configuration information, where the sixth resource configuration information includes at least one of information about a resource occupied by a control resource set in which the second PDCCH search space is located, an identifier of the second PDCCH search space, and the second offset value, and the second offset value is determined based on the identifier of the second PDCCH search space. Further optionally, the third resource configuration information and/or the sixth resource configuration information may further include the CCE identifier, for example, CCE number information.

Further optionally, the first base station may further send the third notification message to the UE, where the third notification message is used to indicate the third resource configuration information; and the second base station may further send the sixth notification message to the UE, where the sixth notification message is used to indicate the sixth resource configuration information. Therefore, the UE can determine the two PDCCH search spaces based on the third resource configuration information and the sixth resource configuration information. Further, the third notification message or the sixth notification message may be sent to the UE by the first base station or the second base station when the first base station or the second base station configures the control resource set. For example, the third resource configuration information or the sixth resource configuration information may be carried in configuration information of the control resource set and sent to the UE; or the third resource configuration information or the sixth resource configuration information may be carried in configuration information of the search space (for example, the third resource configuration information is carried in configuration information of the first search space, and the sixth resource configuration information is carried in configuration information of the second search space). Further optionally, the configuration information of the control resource set or the configuration information of the search space may further include information such as a quantity of PDCCHs, a quantity of search spaces, a number of the search space, an aggregation level, a control information format, and a control information size. For a specific configuration method, refer to the foregoing embodiment. No more details are described herein.

Figure 8C:
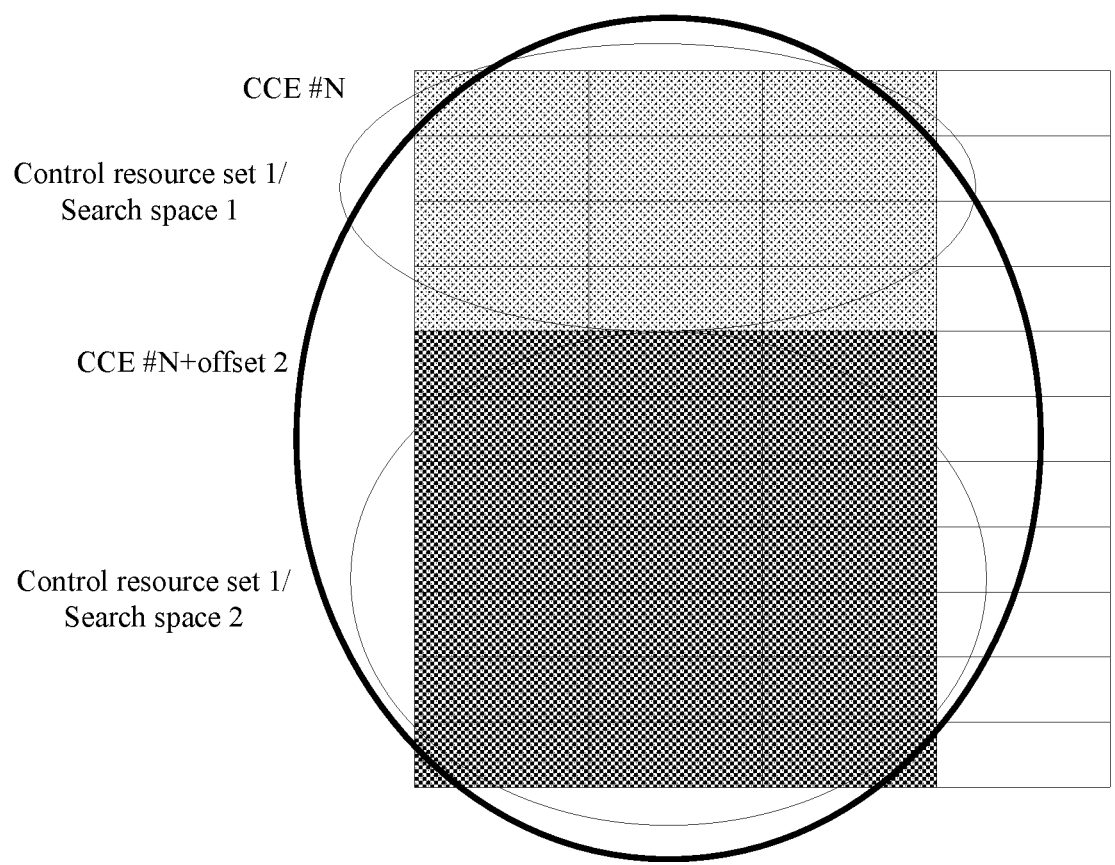
FIG. 8c is still another schematic structural diagram of control resource sets and search spaces according to an embodiment of the present invention.

Specifically, the first PDCCH search space (a search space 1, search space 1) and the second PDCCH search space (a search space 2, search space 2) may be located in one control resource set (a control resource set 1, control resource set 1). Further, a CCE number of the PDCCH search space may be related to a number of the search space. For example, one second offset value offset 2 may be configured in the configuration information of the search space. Specifically, for example, offset 2 for the first search space is configured to 0, and offset 2 for the second search space is configured to a value offset 2. A CCE number of the first PDCCH search space may be determined according to a formula, and a CCE number of the second PDCCH search space may increase by the value offset 2. For example, if a calculated CCE number of the first PDCCH search space is 1, a CCE number of the second PDCCH search space may be 1+offset 2. Offset 2 may be a fixed value or may be notified to the UE by the base station through signaling. For example, offset 2 may be an integer such as 8, 16, 32, or 64. Offset 2 may be related to the number of the PDCCH search space. For example, offset 2=N*M, where N is a number of a search space search space, and M is an offset difference which is an integer such as 8, 16, 32, or 64. As shown in FIG. 8c, the largest circle indicates a resource location of the control resource set 1; the circle above indicates a CCE location of the search space 1 of the control resource set 1; and the circle below indicates a CCE location of the search space 2 of the control resource set 2, and a corresponding CCE number increases by the value offset 2.

Further optionally, for different control resource sets, the first base station or the second base station may perform REG-to-CCE mapping and CCE-to-search space candidate mapping. The mapping may be localized mapping or distributed mapping.

Optionally, the first base station may further send a seventh notification message to the UE, where the seventh notification message includes an identifier of a third time element occupied by the first PDCCH search space; and the second base station may further send an eighth notification message to the UE, where the eighth notification message includes an identifier of a fourth time element occupied by the second PDCCH search space.

Figure 9:
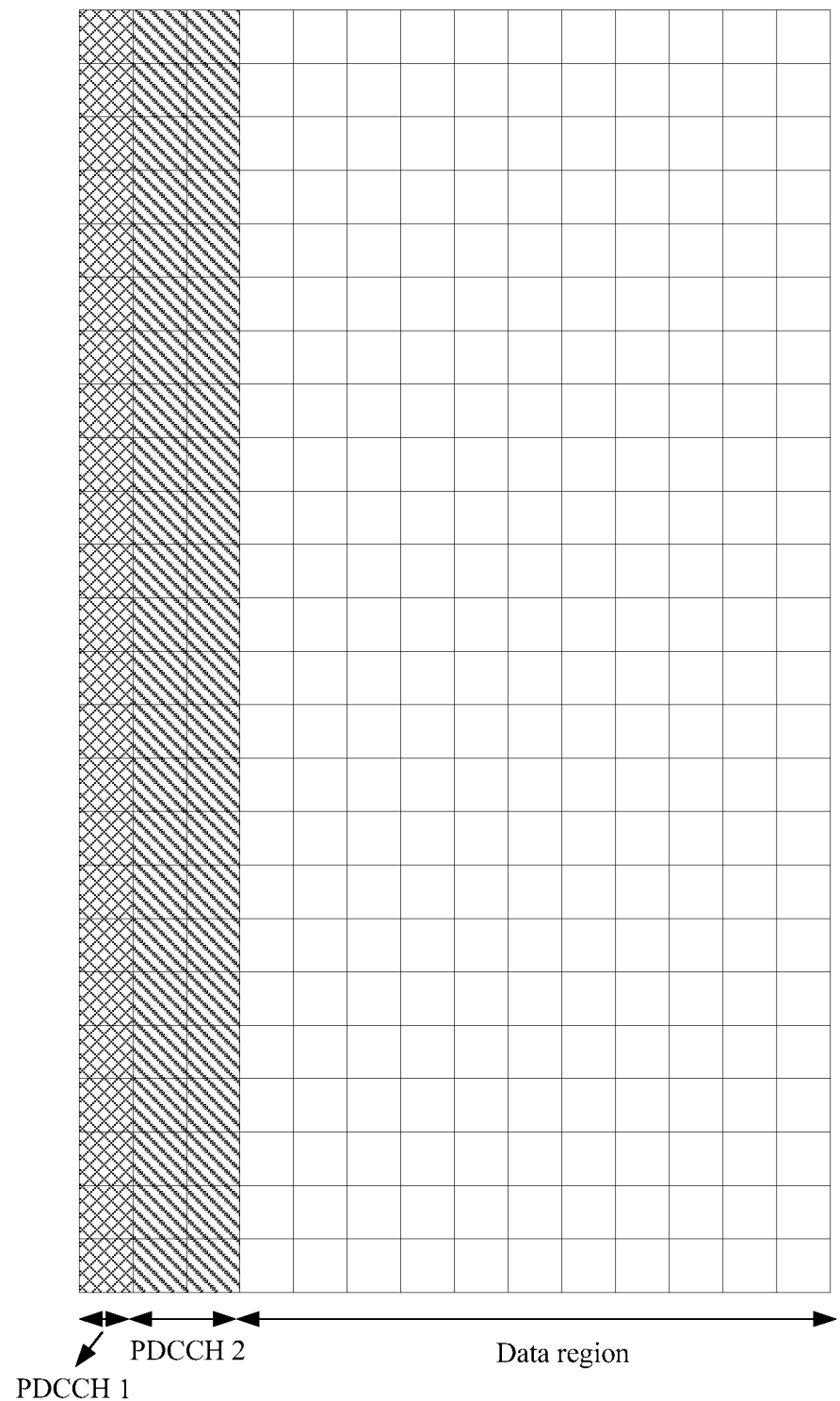
FIG. 9 is a schematic diagram of a search space configuration based on time division according to an embodiment of the present invention.

In other words, the third resource may include a time domain resource; and when the first PDCCH search space is different from the second PDCCH search space, the first PDCCH search space and the second PDCCH search space may be further differentiated based on time domain resources. For example, the first PDCCH search space and the second PDCCH search space may occupy different time domain resources. As shown in FIG. 9, a location of a time element used by the first PDCCH search space or the first PDCCH (a PDCCH 1) may be differentiated from a location of a time element used by the second PDCCH search space or the second PDCCH (a PDCCH 2). A time unit corresponding to the time element may be a subframe, a slot, a mini-slot, a symbol, or the like. In FIG. 9, the time unit being a symbol is used as an example. For example, the first PDCCH search space occupies a resource corresponding to the first symbol and the second PDCCH search space occupies resources corresponding to the second and third symbols. Optionally, for different time domain resources, the first base station or the second base station may perform REG-to-CCE mapping and CCE-to-search space candidate mapping. The mapping may be localized mapping or distributed mapping.

For example, the first base station and the second base station may indicate time element identifiers such as symbol number information of the PDCCH 1 and the PDCCH 2 respectively. For example, the first base station and the second base station indicate, in the control resource set, symbol number information of the PDCCH 1 and the PDCCH 2. Optionally, the symbol number information may be represented by two bits. For example, 00 represents the first symbol, 01 represents the second symbol, 10 represents the third symbol, and 11 represents the fourth symbol. Alternatively, the symbol number information may be in a bitmap form and is represented by four bits. For example, 1100 indicates that the first symbol and the second symbol are used, 0011 indicates that the third symbol and the fourth symbol are used, 1010 indicates that the first symbol and the third symbol are used, 0101 indicates that the second symbol and the fourth symbol are used, or the like. Alternatively, the symbol number information may be indicated by other quantities of bits or other bit meanings, which are not numerated herein. Alternatively, the symbol number information may be indicated directly. For example, symbols #0 and #1 may indicate that symbol locations with symbol numbers of 0 and 1 are used. This is not limited in this embodiment of the present invention.

For another example, the first base station and the second base station may alternatively first indicate a quantity of cell-specific symbols, and then indicate a UE-specific symbol location. Therefore, the first base station and the second base station may notify a quantity of available symbols of all UEs in their respective cells. For example, the first base station notifies that there are two available symbols for UEs in a cell, and the second base station notifies that there are three available symbols for UEs in a cell. The first base station and the second base station may further notify UE of an available symbol number. For example, the first base station notifies the UE that an available symbol number for the PDCCH 1 is 0, and the second base station notifies the UE that an available symbol number for the PDCCH 2 is 2. Alternatively, the first base station and the second base station may directly indicate a UE-specific symbol location. For example, the first base station and the second base station may notify UE of an available symbol number. For example, the first base station notifies the UE that an available symbol number for the PDCCH 1 is 0, and the second base station notifies the UE that an available symbol number for the PDCCH 2 is 2.

Figure 10A:
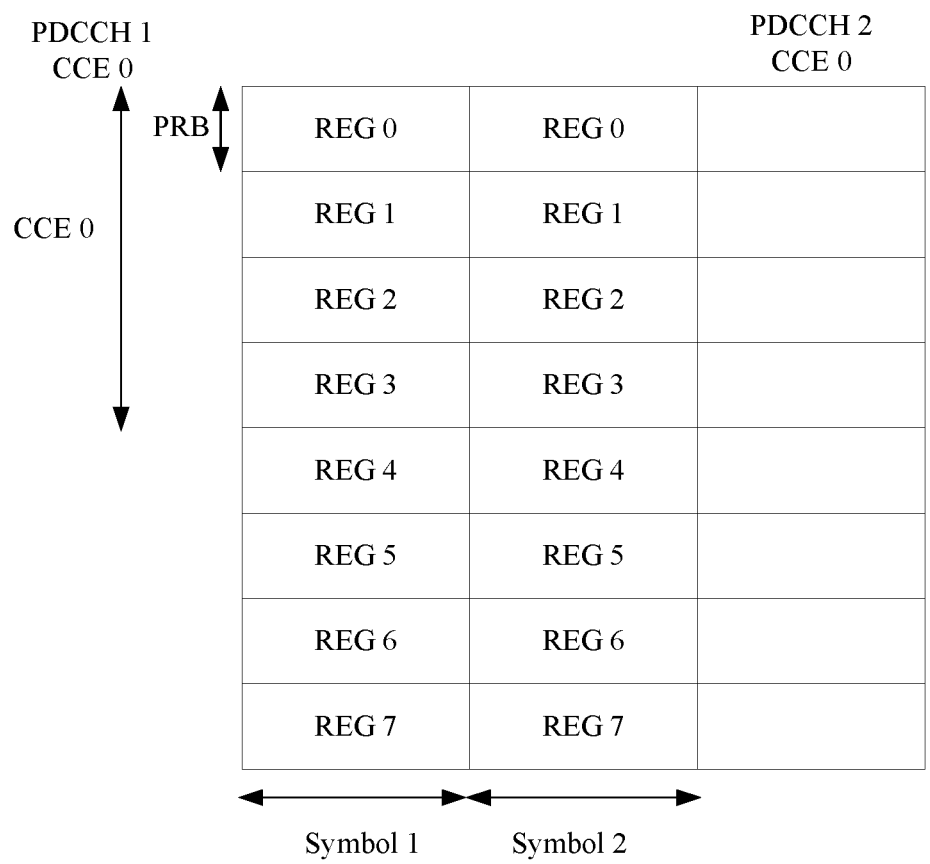
FIG. 10a is a schematic structural diagram of CCEs of search spaces according to an embodiment of the present invention.

Optionally, if the PDCCH 1 and the PDCCH 2 occupy different time domain resources, CCEs may be numbered from 0. As shown in FIG. 10a, it is assumed that for two control resource sets, a symbol 0 represents the first control resource set, symbols 1 and 2 represent the second control resource set, and both the two control resource sets are numbered from 0. In this case, if one or two symbols are also allocated to other UEs, separate CCE numbering may be performed for each control resource set, and the UE performs searching based on CCEs for blind detection that are calculated based on a total $N_{CCE}$ of each control resource set. This can avoid interleaving of different symbols. The symbol number may be carried in an indication of the control resource set.

Figure 10B:
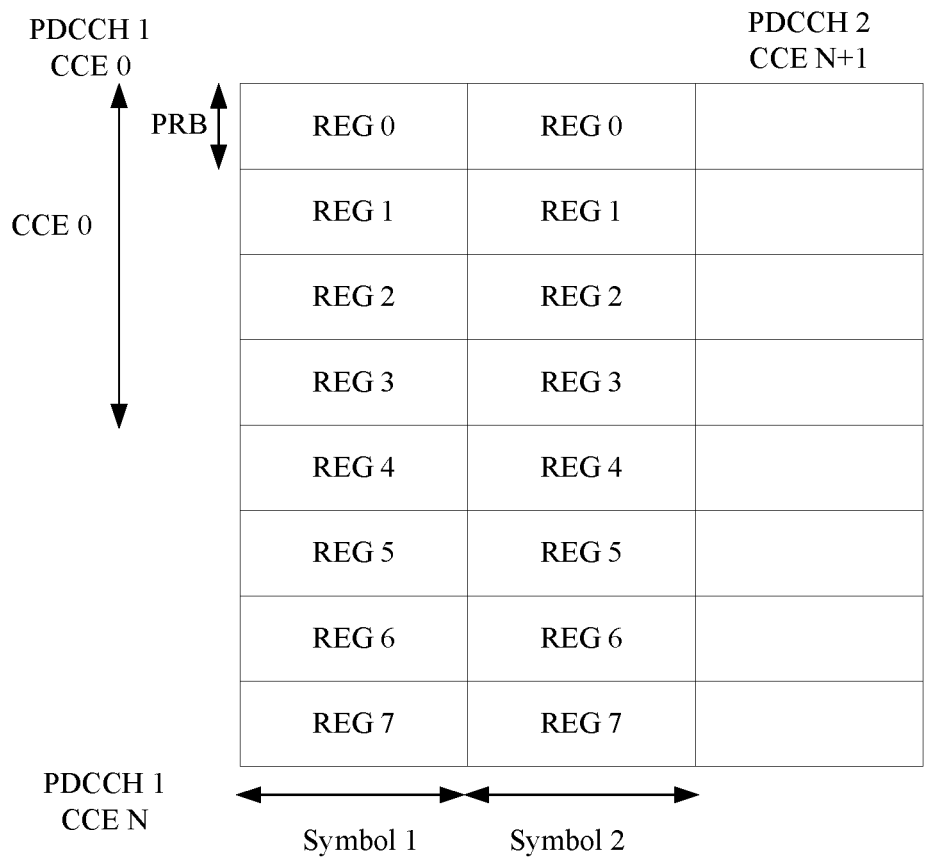
FIG. 10b is another schematic structural diagram of CCEs of search spaces according to an embodiment of the present invention.

Optionally, if the PDCCH 1 and the PDCCH 2 occupy different time domain resources, CCEs may be numbered consecutively based on symbol locations. As shown in FIG. 10b, it is assumed that for two control resource sets, when a symbol 0 represents the first control resource set and symbols 1 and 2 represent the second control resource set, numbers of the two control resource sets are related to locations of the symbols. For example, CCEs of the control resource set in the symbol 0 may be numbered from 0, and CCEs of the control resource set in the symbol 1 are numbered from N, where N is a total quantity of CCEs included in the first symbol.

Further optionally, the symbol location information may be carried in configuration information of a control resource set and sent to the UE. For example, the first base station or the second base station may further configure one control resource set, and add information about two symbol locations (where the symbol location may be at least one of a quantity of symbols and a symbol number) to configuration information of the control resource set, where the two symbol locations may correspond to two search spaces, respectively. Alternatively, the first base station or the second base station may configure two control resource sets, and each control resource set may carry information about one symbol location; or the like. This is not limited in this embodiment of the present invention.

203. The first base station sends the first PDCCH to the UE by using the first resource.

204. The second base station sends the second PDCCH to the UE by using the second resource.

Further, after determining a resource location of a PDCCH, the first base station and the second base station may send the PDCCH at the resource location. The first resource may be a time-frequency domain resource or a code division resource.

Further, in an optional embodiment, both steps 203 and 204 may be performed, or only one of them may be performed. For example, when both the first base station and the second base station are coordinated base stations of the UE, base stations transmitting data at different moments may be different. For example, when at a moment 1, both the first base station and the second base station need to send downlink control information (channel) to perform data scheduling for the UE, steps 203 and 204 may all be performed. For another example, when at a moment 2, only the first base station needs to send downlink control information to perform data scheduling for the UE, only step 203 needs to be performed. For still another example, when at a moment 3, only the second base station needs to send downlink control information to perform data scheduling for the UE, only step 204 needs to be performed. Which base station or base stations perform data scheduling for the UE may depend on scheduling related information such as a channel condition and scheduling decision of a base station. The moments 1, 2, and 3 may be specific identifiers of time elements. For example, a time unit corresponding to the time element may be a radio frame, a subframe, a slot, a mini-slot, a symbol, or the like.

205. The UE determines the first search space of the first PDCCH and the second search space of the second PDCCH.

Specifically, when PDCCH search spaces of a plurality of PDCCHs that are received by the UE are different, during determining of the PDCCH search spaces of the plurality of PDCCHs, the UE may separately determine resources occupied by the PDCCH search spaces of the plurality of PDCCHs and separately determine the PDCCH search spaces of the plurality of PDCCHs based on the resources. The resource may include a frequency domain resource or a time domain resource.

Optionally, when separately determining the resources occupied by the PDCCH search spaces of the plurality of PDCCHs, the UE may determine, according to a specific rule, the resources occupied by the PDCCH search spaces of the plurality of PDCCHs, or determine, based on notification messages sent by a plurality of base stations, the resources occupied by the PDCCH search spaces of the plurality of PDCCHs. For example, the UE may receive the first notification message that is used for indicating the first resource configuration information and that is sent by at least one base station such as the first base station and the fourth notification message that is used for indicating the fourth resource configuration information and that is sent by the second base station, and determine, based on the first resource configuration information and the fourth resource configuration information, the resources occupied by the PDCCH search spaces of the plurality of PDCCHs. The first resource configuration information and the fourth resource configuration information may include information about resources occupied by control resource sets in which the PDCCH search spaces of the plurality of PDCCHs are located. In this embodiment of the present invention, the first resource configuration information and the fourth resource configuration information may be resource configuration information of the first base station and resource configuration information of the second base station that are sent by the first base station and the second base station, respectively. That is, the first resource configuration information may include information about a resource occupied by a control resource set in which the first PDCCH search space is located, and the fourth resource configuration information may include information about a resource occupied by a control resource set in which the second PDCCH search space is located. That means there are two control resource sets, and a quantity of the PDCCH search spaces corresponding to the plurality of PDCCHs is the same as a quantity of the control resource sets. Further optionally, the first resource configuration information and/or the fourth resource configuration information may further include the CCE identifier, for example, CCE number information. The UE may obtain the first resource configuration information or the fourth resource configuration information by receiving configuration information of the control resource set from the first base station or the second base station. That is, the first resource configuration information or the fourth resource configuration information may be configuration information of a control resource set that is sent by a base station.

Specifically, the first PDCCH search space and the second PDCCH search space may be located in two control resource sets, and frequency domain resources of the two sets do not overlap, that is, the control resource sets in which the two PDCCH search spaces are located are different. Further, CCEs of each set may be numbered from 0, as shown in FIG. 8a. Therefore, the UE may calculate, in the control resource set 1 and the control resource set 2, search space locations based on the CCE numbers and perform blind detection on search space candidates.

Optionally, when separately determining the resources occupied by the PDCCH search spaces of the plurality of PDCCHs, the UE may further receive the second notification message that is used for indicating the second resource configuration information and that is sent by the first base station and the fifth notification message that is used for indicating the fifth resource configuration information and that is sent by the second base station, and determine, based on the second resource configuration information and the fifth resource configuration information, the resources occupied by the first PDCCH search space and the second PDCCH search space. The second resource configuration information and the fifth resource configuration information may include at least one of information about resources occupied by two control resource sets in which the first PDCCH search space and the second PDCCH search space are located, identifiers of the two control resource sets, and the first offset value. The first offset value may be determined based on the identifiers of the two control resource sets (or the first offset value may be determined by the UE, or the offset value is predefined), and the resources occupied by the two control resource sets overlap. Further optionally, the second resource configuration information and/or the fifth resource configuration information may further include the CCE identifier, for example, CCE number information. The UE may obtain the second resource configuration information or the fifth resource configuration information by receiving configuration information of the control resource set from the first base station or the second base station. That is, the second resource configuration information or the fifth resource configuration information may be configuration information of a control resource set that is sent by a base station.

Specifically, the first PDCCH search space and the second PDCCH search space may be located in two control resource sets, that is, the control resource set 1 and the control resource set 2, and resources of the two sets may completely overlap. Further, a CCE number of the PDCCH search space may be related to a set number. For example, one first offset value offset 1 may be configured, and a CCE number of the first PDCCH search space corresponding to the first set may be determined according to a formula, and a CCE number of the PDCCH search space corresponding to the second set may increase by the value offset 1. For example, if a CCE number of the first set is 1, a calculated CCE number of the second set may be 1+offset 1. Offset 1 may be a fixed value or may be notified to the UE by the base station through signaling. No more details are described herein. As shown in FIG. 8b, the UE may calculate, in the control resource set 1 and the control resource set 2, search space locations based on the CCE numbers and perform blind detection on search space candidates.

Optionally, when separately determining the resources occupied by the PDCCH search spaces of the plurality of PDCCHs, the UE may further receive the third notification message that is used for indicating the third resource configuration information and that is sent by the first base station and the sixth notification message that is used for indicating the sixth resource configuration information and that is sent by the second base station, and determine, based on the third resource configuration information and the sixth resource configuration information, the resources occupied by the first PDCCH search space and the second PDCCH search space. The third resource configuration information and the sixth resource configuration information may be resource configuration information of the first base station and resource configuration information of the second base station that are sent by the first base station and the second base station, respectively. The third resource configuration information may include at least one of information about a resource occupied by a control resource set in which the first PDCCH search space is located, an identifier of the first PDCCH search space, and the second offset value. The sixth resource configuration information may include at least one of information about a resource occupied by a control resource set in which the second PDCCH search space is located, an identifier of the second PDCCH search space, and the second offset value. The second offset value is determined based on the identifier of the first PDCCH search space and the identifier of the second PDCCH search space (where the second offset value may be alternatively determined by the UE), and the control resource set in which the first PDCCH search space is located is the same as the control resource set in which the second PDCCH search space is located. Further optionally, the third resource configuration information and/or the sixth resource configuration information may further include the CCE identifier, for example, CCE number information. The UE may obtain the third resource configuration information or the sixth resource configuration information by receiving configuration information of the control resource set or the configuration information of the search space from the first base station or the second base station. That is, the third resource configuration information or the sixth resource configuration information may be the configuration information of the control resource set or the configuration information of the search space that is sent by a base station.

Specifically, the first PDCCH search space (the search space 1) and the second PDCCH search space (the search space 2) may be located in one control resource set (the control resource set 1). Further, a CCE number of the PDCCH search space may be related to a number of the search space. For example, one second offset value offset 2 may be configured, and a CCE number of the first PDCCH search space may be determined according to a formula, and a CCE number of the second PDCCH search space may increase by the value offset 2. For example, if a calculated CCE number of the first PDCCH search space is 1, a CCE number of the second PDCCH search space may be 1+offset 2. Offset 2 may be a fixed value or may be notified to the UE by the base station through signaling. No more details are described herein. As shown in FIG. 8c, the UE may calculate, in the control resource set 1 and the control resource set 2, search space locations based on the CCE numbers and perform blind detection on search space candidates.

Further optionally, the resource may include a time domain resource, and the UE may further receive notification messages sent by the first base station and the second base station such as the seventh notification message and the eighth notification message. The notification messages include an identifier of a third time element occupied by the first PDCCH search space and an identifier of a fourth time element occupied by the second PDCCH search space, respectively. Therefore, the first PDCCH search space and the second PDCCH search space may be differentiated based on time domain resources, as shown in FIG. 9. The UE may determine search spaces based on the identifiers of the time elements, for example, symbol numbers, occupied by the PDCCH search spaces and perform blind detection.

In other words, the search space may be determined based on at least one of an aggregation level, a quantity of PDCCHs, a control information format, a control information size, and a quantity of search spaces. For example, the aggregation level, the quantity of PDCCHs, the control information format, the control information size, and the quantity of search spaces may be notified by the base station to the UE, for example, notified to the UE when the base station determines the control resource set.

For example, the first base station or the second base station may notify the UE of one or more aggregation levels when configuring (determining) the control resource set. For example, the first base station or the second base station may configure an aggregation level to 4, and the UE detects only a candidate corresponding to the aggregation level 4 during monitoring; or the first base station or the second base station may configure a plurality of aggregation levels such as 4, 8, and 16, and the UE detects only candidates corresponding to the indicated aggregation levels during monitoring. In this way, fewer blind detections are performed. Alternatively, the first base station or the second base station may notify the UE of a quantity of PDCCHs that need to be monitored for the control resource set. For example, if the UE is configured to monitor one PDCCH, the UE stops monitoring after one PDCCH is detected or a maximum quantity of blind detections is reached; and if the UE is configured to monitor two PDCCHs, the UE stops monitoring after two PDCCHs are detected or a maximum quantity of blind detections is reached.

For another example, the first base station or the second base station may notify the UE of a quantity of PDCCHs that need to be monitored for the control resource set and a corresponding aggregation level. For example, if it is configured that the UE detects one PDCCH and that a corresponding aggregation level is 4, the UE performs monitoring only on a candidate corresponding to the aggregation level 4, and the UE stops the monitoring after one PDCCH is detected or the maximum quantity of blind detections is reached; or if it is configured that the UE detects one PDCCH and that corresponding aggregation levels are a plurality of aggregation levels such as 4, 8, and 16, the UE performs monitoring only on candidates corresponding to the indicated aggregation levels, and the UE stops the monitoring after one PDCCH is detected or the maximum quantity of blind detections is reached; or if the first base station or the second base station may configure that the UE detects two PDCCHs and that aggregation levels corresponding to the two PDCCHs are the same, for example, the corresponding aggregation levels are 4, the UE may perform monitoring only on candidates corresponding to the aggregation level 4, and the UE stops the monitoring after two PDCCHs are detected or the maximum quantity of blind detections is reached; or if it is configured that the UE detects two PDCCHs and that aggregation levels corresponding to the two PDCCHs are the same, for example, the corresponding aggregation levels are a plurality of aggregation levels such as 4, 8, and 16, the UE performs monitoring only on candidates corresponding to the indicated aggregation levels, and the UE stops monitoring after two PDCCHs are detected or the maximum quantity of blind detections is reached; or if the first base station or the second base station may configure that the UE detects two PDCCHs and that aggregation levels corresponding to the two PDCCHs are different, for example, an aggregation level corresponding to the first PDCCH is 4 and an aggregation level corresponding to the second PDCCH is 8, the UE performs monitoring only on a candidate corresponding to the aggregation level 4 for the first PDCCH, and after one PDCCH is detected or the maximum quantity of blind detections is reached, the UE performs monitoring only on a candidate corresponding to the aggregation level 8 for the second PDCCH, and stops the monitoring after one PDCCH is detected or the maximum quantity of blind detections is reached, where a detection order of the first PDCCH and the second PDCCH may not be limited. Alternatively, if the first base station or the second base station may configure that the UE detects two PDCCHs and that aggregation levels corresponding to the two PDCCHs are different, for example, aggregation levels corresponding to the first PDCCH are a plurality of aggregation levels such as 4, 8, and 16 and aggregation levels corresponding to the second PDCCH are a plurality of aggregation levels such as 8, 16, and 32, the UE may perform monitoring only on candidates corresponding to the indicated aggregation levels such as 4, 8, and 16 for the first PDCCH, and after one PDCCH is detected or the maximum quantity of blind detections is reached, the UE performs monitoring only on candidates corresponding to the indicated aggregation levels such as 8, 16, and 32 for the second PDCCH, and stops the monitoring after one PDCCH is detected or the maximum quantity of blind detections is reached, where a detection order of the first PDCCH and the second PDCCH may not be limited, and they may be detected simultaneously. For example, when aggregation levels of the two PDCCHs are the same, detection may be performed on the two PDCCHs simultaneously. This is not limited in this embodiment of the present invention.

Further optionally, the first base station or the second base station may further notify the UE of at least one of a control information format or a control information size for the control resource set. For example, it is configured that the UE detects a PDCCH for which a control information format is DCI format 2D or a control information size is A, where a value of A is 20 bits, 40 bits, or another value. Information about a plurality of control information quantities or a plurality of control information sizes may be configured for a plurality of search spaces or a plurality of PDCCHs. Alternatively, information about one control information quantity or one control information size may be configured for a plurality of search spaces or a plurality of PDCCHs. Alternatively, information about a plurality of control information quantities or a plurality of control information sizes may be configured for one search space or one PDCCH. Alternatively, the control information quantity or the control information size is predefined. With this solution, the UE can correctly detect and decode the PDCCH.

Further optionally, the first base station or the second base station may notify the UE of a quantity of search spaces for the control resource set, where one search space may include one or more PDCCHs, and may further notify the UE of a quantity of PDCCHs for the search space and a corresponding aggregation level, a control information format, and a control information size. No more details are described herein.

206. The UE determines, in the first search space, the first resource occupied by the first PDCCH and determines, in the second search space, the second resource occupied by the second PDCCH.

207. The UE obtains the first PDCCH by using the first resource and obtains the second PDCCH by using the second resource.

Further, after determining a search space of each PDCCH, the UE may determine a resource occupied by each PDCCH in the PDCCH search space and obtain the PDCCH by using the resource. The resource includes a time-frequency resource or a resource obtained through code division. Therefore, the UE can obtain the PDCCH on the determined time-frequency resource or obtain the PDCCH on the determined code division resource.

In this embodiment of the present invention, a plurality of base stations can send a plurality of PDCCHs to the UE in different PDCCH search spaces of the UE, so that the UE can receive the plurality of PDCCHs and schedule data on one carrier through the plurality of PDCCHs. This improves information transmission efficiency and information transmission reliability. In this embodiment of the present invention, different control resource sets and search spaces are configured based on time-frequency resources, and search space candidates of the plurality of PDCCHs are designed to ensure that CCEs of the plurality of PDCCHs do not overlap. This resolves a prior-art problem that transmission of a plurality of PDCCHs cannot be supported, improves distributed MIMO multi-stream transmission performance in coordinated transmission, decreases blind detections of the UE, and improves blind detection efficiency of the UE.

Figure 11:
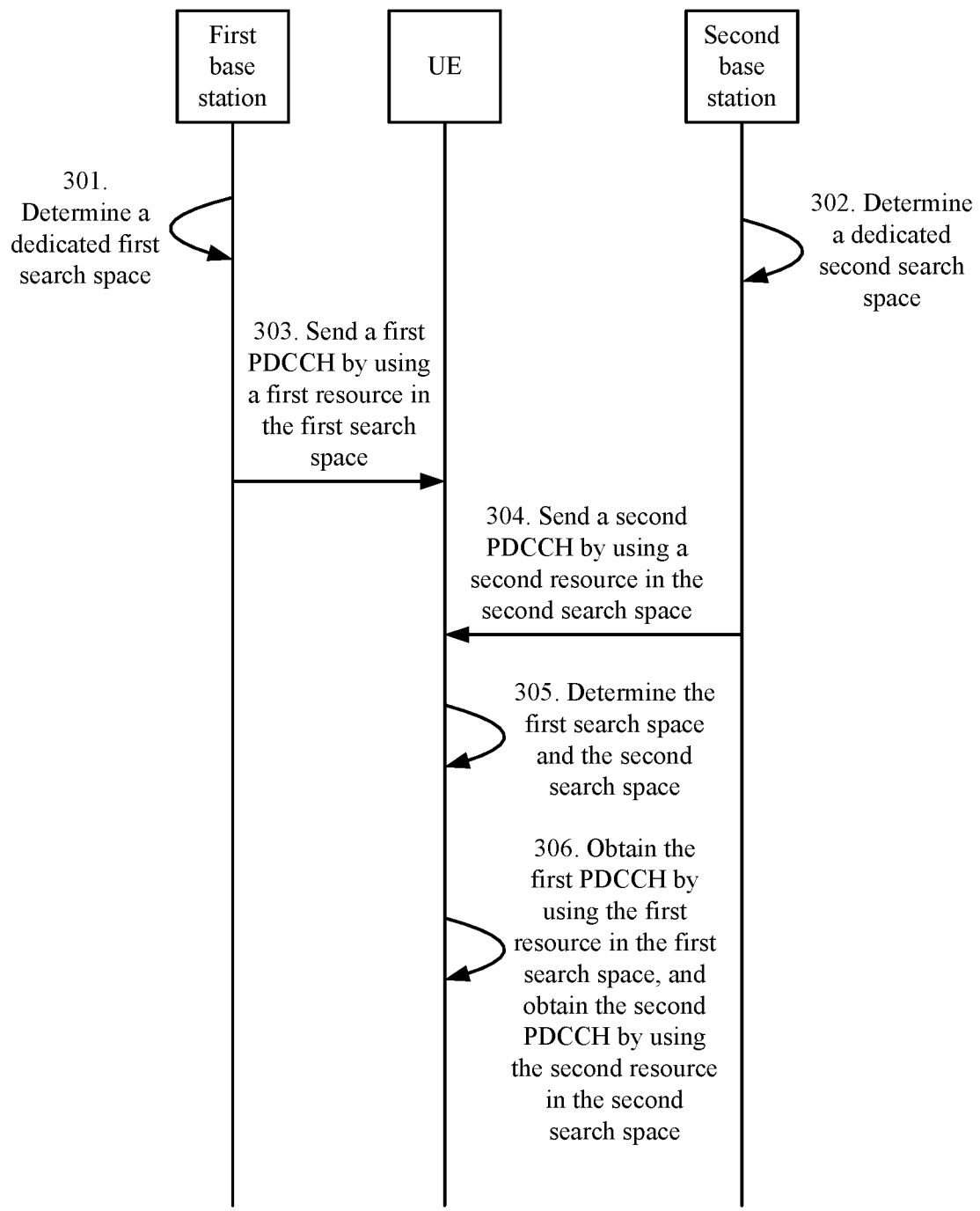
FIG. 11 is a schematic interaction diagram of still another channel transmission method according to an embodiment of the present invention.

FIG. 11 is a schematic interaction diagram of still another channel transmission method according to an embodiment of the present invention. Specifically, as shown in FIG. 11, the channel transmission method in this embodiment of the present invention includes the following steps.

301. A first base station determines a coordinated first search space.

302. A second base station determines a coordinated second search space.

Optionally, the first base station may further determine the first PDCCH search space (that is, the first search space) based on a third parameter. Corresponding, the second base station may further determine the second PDCCH search space (that is, the second search space) based on a third parameter. The first PDCCH search space or the second PDCCH search space may include at least one CCE, and the third parameter includes a quantity of CCEs or a CCE identifier. Further optionally, a quantity of CCEs (or a CCE identifier) included in the third parameter corresponding to the first PDCCH search space may be the same as or different from that included in the third parameter corresponding to the second PDCCH search space.

To be specific, the coordinated first PDCCH search space or the second PDCCH search space is a search space dedicated for coordinated transmission (also referred to as a "coordinated search space"), and the first PDCCH search space and the second PDCCH search space may be predefined. Optionally, the coordinated first PDCCH search space and the second PDCCH search space may be search spaces configured for UE, or may be search spaces centrally configured by a base station, or may be search spaces respectively configured by different base stations, or the like. This is not limited in this embodiment of the present invention.

For example, for the manner of configuring a coordinated search space for the UE, a size and a location of the coordinated search space may be predefined, and the coordinated search space is associated with an identifier of the UE. For example, first 16 CCEs of a slot are used as the coordinated search space of the UE, and in this manner, the first PDCCH search space is the same as the second PDCCH search space. Optionally, for the UE for which the coordinated search space is configured, blind detection may be performed on PDCCHs according to a specific rule, for example, determining of a search space of a PDCCH is related to whether the PDCCH is a coordinated control channel. If the PDCCH is a coordinated control channel, $Y_k$ used for determining the search space is set to a fixed value. For example, $Y_k$ is set to 1, 2, or the like. Alternatively, it is assumed that $Y_k'=Y_k+ID_{TP}$, and $Y_k'$ may be used as $Y_k$ and be substituted into the foregoing formula to determine the search space. $ID_{TP}$ may represent an identifier of a coordinated cell, and the identifier may be a cell number or another identifier. Further, if the coordinated search space has remaining space, a search space of normal UE and a search space of coordinated UE may overlap, that is, the normal UE may also use the coordinated search space, to avoid waste of resources. For example, when an RNTI of UE mod $\lfloor N_{CCE, k}/L \rfloor$ is equal to 1, a search space of the UE may totally or partially overlap with the coordinated search space, and a PDCCH of the UE may be transmitted when the coordinated search space has remaining space.

For another example, the coordinated search space may be centrally configured by a base station. For example, the base station may configure first configuration information through RRC or MAC layer signaling, to determine a common coordinated search space based on the first configuration information. Optionally, the first configuration information may include at least one of the following: coordinated search space-config, used to indicate a configuration of a coordinated search space, or a configuration of a coordinated control resource set; subframe pattern, used to indicate time domain resource configuration information, for example, a subframe, a slot, or a mini-slot; symbol number, used to indicate a quantity of symbols occupied by a coordinated control channel resource; symbol Index, used to indicate number information of a symbol occupied by a coordinated control channel resource (the coordinated control channel resource may be a coordinated search space or a coordinated control resource set); CCE_number, used to indicate a quantity of CCEs occupied by a coordinated search space, or CCE location information, which may be, for example, the first several CCEs in a time element by default; Yk_value, used to indicate a variable value related to calculation of a coordinated search space; and frequencyResource, used to indicate information about a frequency domain resource location occupied by a coordinated control channel resource. In this manner, different base stations share one coordinated search space, and the base stations may allocate CCEs between different base stations according to the foregoing scenario in which search spaces are the same. No more details are described herein. For example, the first configuration information may be shown as follows:

```
Coordinated search space-Config ::=    SEQUENCE{
              subframePattern      MeasSubframePattern         OPTIONAL, -- Need ON
              Symbolnumber-r11     INTEGER (1..4)              OPTIONAL, -- Need OP
              SymbolIndex-r11      BIT STRING (size(4)) or INTEGER (1..4)
                                                               OPTIONAL, -- Need OP
              CCE_number           ENUMERATED {16,32,64}       OPTIONAL,-- Need ON
              Yk_value             INTEGER (0,1..4)            OPTIONAL-- Need ON
              frequencyResource    ENUMERATED {16,32,64} or BIT STRING
                                   (size(4))or INTEGER (1..4)  OPTIONAL,-- Need ON
              }
       }
}
```

For still another example, different base stations may configure different coordinated search spaces. In this case, one base station or different base stations may configure at least two pieces of second configuration information through RRC or MAC layer signaling, where each piece of second configuration information may carry an identifier of a coordinated search space. Optionally, the second configuration information includes at least one of the following: coordinated search space-config, used to indicate a configuration of a coordinated search space, or a configuration of a coordinated control resource set; Coordinated search space_ID, used to indicate a configured identifier of a coordinated search space, or a configured identifier of a coordinated control resource set; subframe pattern, used to indicate time domain resource configuration information, for example, a subframe, a slot, or a mini-slot; symbol number, used to indicate a quantity of symbols occupied by a coordinated control channel resource; symbol Index, used to indicate number information of a symbol occupied by a coordinated control channel resource; CCE_number, used to indicate a quantity of CCEs occupied by a coordinated search space, or CCE location information, for example, the first CCEs by default; Yk_value, used to indicate a variable value related to calculation of a coordinated search space; frequencyResource, used to indicate information about a frequency domain resource location occupied by a coordinated control channel resource; Coordinated search space_ID, used to indicate a configured identifier of a coordinated search space, or a configured identifier of a coordinated control resource set; Coordinated search space_ID_List, used to indicate a configured identifier list of a coordinated search space, or a configured identifier list of a coordinated control resource set; symbol Index_List, used to indicate a number information list of a symbol occupied by a coordinated control channel resource; CCE_index_List, used to indicate a status list of CCEs occupied by a coordinated search space, or a CCE quantity list, or a CCE location information list; and frequencyResource_List, used to indicate an information list of a frequency domain resource location occupied by a coordinated control channel resource. Therefore, the UE can distinguish between CCEs of coordinated search spaces of the plurality of base stations based on the second configuration information, to perform blind detection on PDCCHs without affecting reception of normal UE. For example, the second configuration information may be shown as follows:

303. The first base station sends, on a first resource in the first search space, a first PDCCH to the UE.

304. The second base station sends, on a second resource in the second search space, a second PDCCH to the UE.

305. The UE determines the first search space and the second search space.

306. The UE obtains the first PDCCH by using the first resource in the first search space, and obtains the second PDCCH by using the second resource in the second search space.

Specifically, when determining the first PDCCH search space and the second PDCCH search space, the UE may determine the coordinated first PDCCH search space and the second PDCCH search space still based on parameter information that includes a quantity of CCEs or a CCE identifier and that is sent by the first base station and the second base station, or predefined parameter information such as a quantity of CCEs or a CCE identifier, to perform blind detection on the determined PDCCH search spaces, to obtain the first PDCCH and the second PDCCH.

Optionally, the first search space may be the same as or different from the second search space. For a manner in which the first base station or the second base station determines a resource occupied by a PDCCH and the UE obtains the PDCCH, refer to description in the foregoing embodiment. No more details are described herein.

Further optionally, the first base station or the second base station may further notify the UE of an aggregation level and/or a quantity of PDCCHs and/or a quantity of search spaces and/or a control information format and/or a control information size, so that the UE can determine the search space based on the aggregation level and/or the quantity of PDCCHs and/or the quantity of search spaces and/or the control information format and/or the control information size. For details, refer to description in the foregoing embodiment. No more details are described herein.

In this embodiment of the present invention, a plurality of base stations can send a plurality of PDCCHs to the UE by

```
Coordinated search space_ID INTEGER (1..4)
subframePattern         MeasSubframePattern-r10      OPTIONAL, -- Need ON
Symbolnumber            INTEGER (1..4)               OPTIONAL, -- Need OP
SymbolIndex             BIT STRING (size(4))or INTEGER (1..4)
                                                     OPTIONAL, -- Need OP
CCE_index               ENUMERATED {0~16,16~32,32~64}
                                                     OPTIONAL, -- Need ON
Yk_value                INTEGER (0,1..4)   OPTIONAL, -- Need ON
frequencyResource    ENUMERATED {16,32,64}or BIT STRING (size(4))or
                        INTEGER (1..4)                        OPTIONAL, -- Need ON
        }
    }
}
```

For another example, the second configuration information may be alternatively shown as follows:

using designed coordinated search spaces, so that the UE can receive the plurality of PDCCHs and schedule data on one

```
Coordinated search space-Config::=    SEQUENCE{
    Coordinated search space_ID_LIST INTEGER (1..4)
    symbol Index_List        SEQUENCE{ SIZE OF ENUMERATED
                                 {0,0~1,0~2,1~2,,1,2}} OPTIONAL -- Need ON
    CCE_index_List           SEQUENCE { SIZE OF ENUMERATED
                                 {0~16,16~32,32~64}} OPTIONAL -- Need ON
        frequencyResource_List          SEQUENCE{ ENUMERATED {16,32,64}or
                                 BIT STRING (size(4))or INTEGER (1..4) }
                                 OPTIONAL, -- Need ON
}
``` carrier through the plurality of PDCCHs. In this embodiment of the present invention, search space candidates of the plurality of PDCCHs are designed to ensure that CCEs of the plurality of PDCCHs do not overlap, thereby resolving a prior-art problem that data on one carrier cannot be scheduled because transmission of a plurality of PDCCHs cannot be supported. This improves information transmission efficiency, improves information transmission reliability, decreases blind detections of the UE, and improves blind detection efficiency of the UE.

Figure 12:
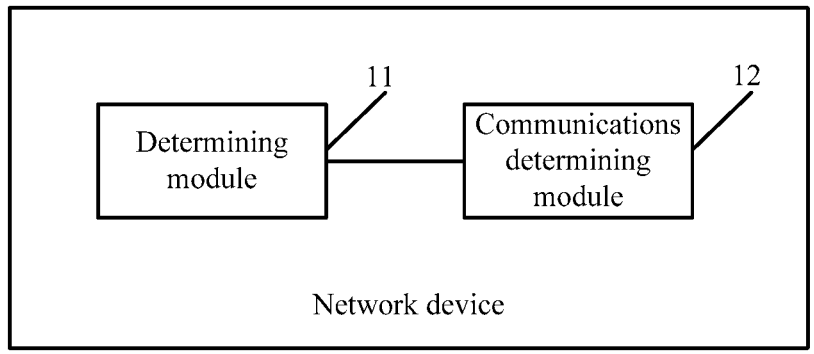
FIG. 12 is a schematic structural diagram of a network device according to an embodiment of the present invention.

FIG. 12 is a schematic structural diagram of a network device according to an embodiment of the present invention. Specifically, as shown in FIG. 12, the network device in this embodiment of the present invention may include a determining module 11 and a communications module 12.

The determining module 11 is configured to determine search spaces of at least two downlink control channels.

The determining module 11 is further configured to separately determine, in the search spaces, resources occupied by the at least two downlink control channels, where resources scheduled by the at least two downlink control channels belong to one carrier.

The communications module 12 is configured to obtain the at least two downlink control channels by using the resources.

Optionally, the search spaces of the at least two downlink control channels may be the same, and when determining the search spaces of the at least two downlink control channels, the determining module 11 may be specifically configured to:

determine the search spaces of the at least two downlink control channels based on a first parameter, where the first parameter includes at least one of a quantity of control channel elements CCEs, an identifier of a first time element, and a candidate location of a downlink control channel.

Further optionally, quantities of CCEs of the search spaces of the at least two downlink control channels are the same; or identifiers of first time elements of the at least two downlink control channels are determined based on subcarrier spacings of the resources occupied by the at least two downlink control channels; or identifiers of first time elements of the at least two downlink control channels are determined based on identifiers of time elements, corresponding to the first time elements of the at least two downlink control channels, among time elements corresponding to a preset subcarrier spacing; or candidate locations of the at least two downlink control channels are different, and the candidate locations of the at least two downlink control channels are determined based on a second parameter, where the second parameter includes at least one of a device type, a device identifier, and an aggregation level.

Optionally, the search spaces of the at least two downlink control channels may be different, and when determining the search spaces of the at least two downlink control channels, the determining module 11 may be specifically configured to:

separately determine resources occupied by the search spaces of the at least two downlink control channels, where the resources occupied by the search spaces of the at least two downlink control channels are different; and separately determine the search spaces of the at least two downlink control channels based on the resources, where the determined resource may include a frequency domain resource or a time domain resource.

Further optionally, when separately determining the resources occupied by the search spaces of the at least two downlink control channels, the determining module 11 may be specifically configured to:

determine first resource configuration information, and determine, based on the first resource configuration information, the resources occupied by the search spaces of the at least two downlink control channels, where the first resource configuration information may include information about resources occupied by control resource sets in which the search spaces of the at least two downlink control channels are located, and a quantity of the search spaces corresponding to the at least two downlink control channels is the same as a quantity of control resource sets.

Further optionally, when separately determining the resources occupied by the search spaces of the at least two downlink control channels, the determining module 11 may be specifically configured to:

determine second resource configuration information, and determine, based on the second resource configuration information, the resources occupied by the search spaces of the at least two downlink control channels, where the second resource configuration information may include at least one of information about resources occupied by at least two control resource sets in which the search spaces of the at least two downlink control channels are located, identifiers of the at least two control resource sets, and a first offset value, the first offset value is determined based on the identifiers of the at least two control resource sets, and the resources occupied by the at least two control resource sets overlap.

Further optionally, when separately determining the resources occupied by the search spaces of the at least two downlink control channels, the determining module 11 may be specifically configured to:

determine third resource configuration information, and determine, based on the third resource configuration information, the resources occupied by the search spaces of the at least two downlink control channels, where the third resource configuration information includes at least one of information about resources occupied by control resource sets in which the search spaces of the at least two downlink control channels are located, identifiers of the search spaces of the at least two downlink control channels, and a second offset value, the second offset value is determined based on the identifiers of the search spaces of the at least two downlink control channels, and the control resource sets in which the search spaces corresponding to the at least two downlink control channels are located are the same.

Further optionally, the resource may include a time domain resource; and the communications module 11 may be further configured to receive a notification message sent by at least one another network device, where the notification message includes identifiers of second time elements occupied by the search spaces of the at least two downlink control channels.

Optionally, the network device may implement, by using the foregoing modules, some or all of the steps performed by the user equipment in the channel transmission methods in the embodiments corresponding to FIG. 2 to FIG. 11. It should be understood that this embodiment of the present invention is an apparatus embodiment corresponding to the method embodiments, and description about the method embodiments is also applicable to this embodiment of the present invention.

Figure 13:
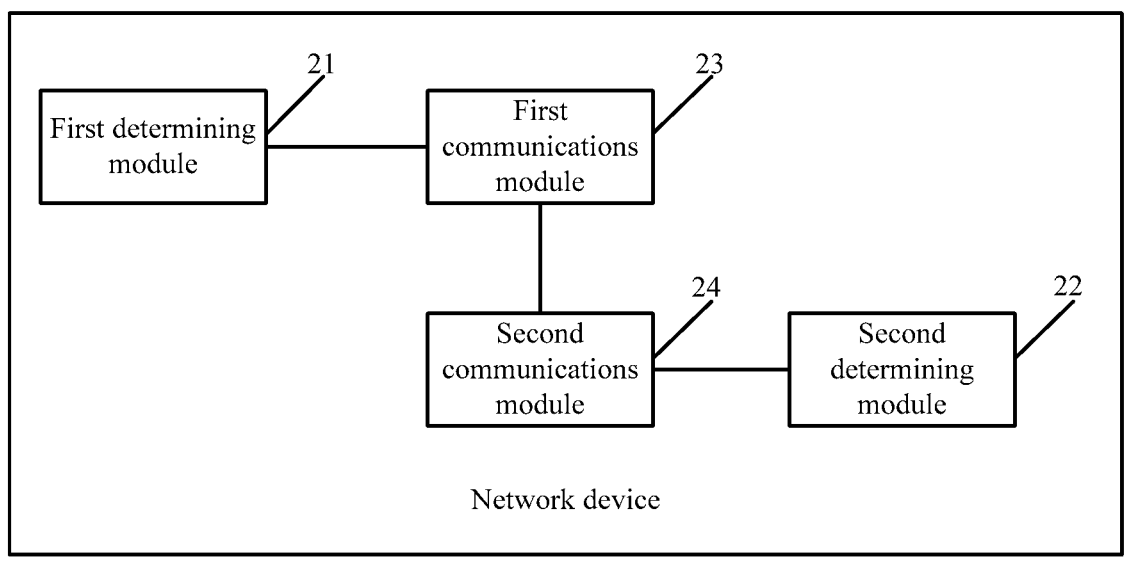
FIG. 13 is a schematic structural diagram of another network device according to an embodiment of the present invention.

FIG. 13 is a schematic structural diagram of another network device according to an embodiment of the present invention. Specifically, as shown in FIG. 13, the network device in this embodiment of the present invention includes a first determining module 21, a second determining module 22, a first communications module 23, and a second communications module 24.

The first determining module 21 is configured to determine, in a first search space, a first resource occupied by a first downlink control channel.

The second determining module 22 is configured to determine, in a second search space, a second resource occupied by a second downlink control channel, where a resource scheduled by the first downlink control channel and a resource scheduled by the second downlink control channel belong to one carrier.

The first communications module 23 is configured to send the first downlink control channel to another network device by using the first resource.

The second communications module 24 is configured to send the second downlink control channel to the another network device by using the second resource.

Optionally, the first determining module 21 and the first communications module 23 may be disposed in a same network device as or a different network device from the second determining module 22 and the second communications module 24. This is not limited in this embodiment of the present invention.

The first search space may be the same as or different from the second search space.

Optionally, the first search space may be the same as the second search space;

the first determining module 21 is further configured to determine the first search space based on a first parameter; and the second determining module 22 is further configured to determine the first search space based on the first parameter, where the first parameter includes at least one of a quantity of CCEs, an identifier of a first time element, and a candidate location of a downlink control channel.

Further optionally, a quantity of CCEs included in the first parameter that is determined by the first determining module 21 is the same as a quantity of CCEs included in the first parameter that is determined by the second determining module 22; or an identifier of a first time element of the first downlink control channel or an identifier of a first time element of the second downlink control channel is determined based on a subcarrier spacing of the first resource and a subcarrier spacing of the second resource; or an identifier of a first time element of the first downlink control channel is determined based on an identifier of a time element, corresponding to the first time element of the first downlink control channel, among time elements corresponding to a preset subcarrier spacing, and an identifier of a first time element of the second downlink control channel is determined based on an identifier of a time element, corresponding to the first time element of the second downlink control channel, among the time elements corresponding to the preset subcarrier spacing; or a candidate location of the first downlink control channel is different from a candidate location of the second downlink control channel, and the candidate location of the first downlink control channel or the candidate location of the second downlink control channel is determined based on a second parameter, where the second parameter includes at least one of a device type, a device identifier, and an aggregation level.

Optionally, the first search space may be different from the second search space; and the first determining module 21 may be further configured to determine a third resource occupied by the first search space, and determine the first search space based on the third resource, where the third resource may include a frequency domain resource or a time domain resource.

Further optionally, when determining the first search space based on the third resource, the first determining module 21 may be specifically configured to:

determine first resource configuration information and determine the first search space based on the first resource configuration information, where the first resource configuration information includes information about a resource occupied by a control resource set in which the first search space is located.

Further optionally, when determining the first search space based on the third resource, the first determining module 21 may be specifically configured to:

determine second resource configuration information and determine the first search space based on the second resource configuration information, where the second resource configuration information includes at least one of information about a resource occupied by a control resource set in which the first search space is located, an identifier of the control resource set, and a first offset value, and the first offset value is determined based on the identifier of the control resource set.

Further optionally, when determining the first search space based on the third resource, the first determining module 21 may be specifically configured to:

determine third resource configuration information and determine the first search space based on the third resource configuration information, where the third resource configuration information includes at least one of information about a resource occupied by a control resource set in which the first search space is located, an identifier of the first search space, and a second offset value, and the second offset value is determined based on the identifier of the first search space.

Further optionally, the first search space may be different from the second search space; and the second determining module 22 may be further configured to determine a fourth resource occupied by the second search space and determine the first search space based on the fourth resource. Specifically, a manner of determining the second search space based on the fourth resource by the second determining module 22 is the same as the manner of determining the first search space based on the third resource by the first determining module 21. No more details are described herein.

Optionally, the third resource may include a time domain resource; and the first communications module 23 is further configured to send a notification message to the another network device, where the notification message includes an identifier of a second time element occupied by the first search space.

Optionally, the first determining module 21 is further configured to determine the first search space based on a third parameter, where the first search space includes at least one CCE, and the third parameter includes a quantity of CCEs or a CCE identifier.

Specifically, a manner of determining, in the second search space, the second resource occupied by the second downlink control channel and sending the second downlink control channel by the first communications module 23 and the second communications module 24 is similar to the manner of determining, in the first search space, the first resource occupied by the first downlink control channel and sending the first downlink control channel by the first determining module 21 and the second determining module 22. No more details are described herein.

Optionally, the network device may implement, by using the foregoing modules, some or all of the steps performed by the base station in the channel transmission methods in the embodiments corresponding to FIG. 2 to FIG. 11. It should be understood that this embodiment of the present invention is an apparatus embodiment corresponding to the method embodiments, and description about the method embodiments is also applicable to this embodiment of the present invention.

In this embodiment of the present invention, search space candidates of a plurality of downlink control channels are designed to ensure that CCEs of the plurality of downlink control channels do not overlap. This resolves a prior-art problem that data on one carrier cannot be scheduled because transmission of a plurality of PDCCHs cannot be supported, decreases blind detections of user equipment, and improves blind detection efficiency.

Figure 14:
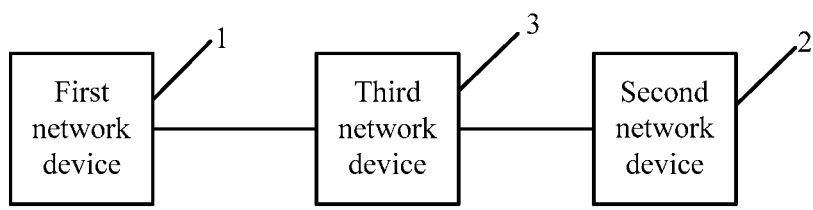
FIG. 14 is a schematic structural diagram of a channel transmission system according to an embodiment of the present invention.

FIG. 14 is a schematic structural diagram of a channel transmission system according to an embodiment of the present invention. Specifically, as shown in FIG. 14, the information transmission system in this embodiment of the present invention may include a first network device 1, a second network device 2, and a third network device 3.

The first network device 1 is configured to determine, in a first search space, a first resource occupied by a first downlink control channel and send the first downlink control channel to the third network device 3 by using the first resource.

The second network device 2 is configured to determine, in a second search space, a second resource occupied by a second downlink control channel and send the second downlink control channel to the third network device 3 by using the second resource, where a resource scheduled by the first downlink control channel and a resource scheduled by the second downlink control channel belong to one carrier.

The third network device 3 is configured to: determine the first search space of the first downlink control channel and the second search space of the second downlink control channel, determine, in the first search space, the first resource occupied by the first downlink control channel, determine, in the second search space, the second resource occupied by the second downlink control channel, obtain the first downlink control channel by using the first resource, and obtain the second downlink control channel by using the second resource.

Optionally, the first search space may be the same as or different from the second search space. The network device such as the foregoing first network device, second network device, or third network device may be a base station or may be user equipment. The first network device and the second network device may be a same network device, that is, a same network device, for example, a base station, sends a plurality of downlink control channels to another network device, for example, user equipment; or the first network device and the second network device may be different network devices. This is not limited in this embodiment of the present invention.

Specifically, for the first network device and the second network device, refer to related description of the base station in the embodiments corresponding to FIG. 2 to FIG. 11; and for the third network device, refer to related description of the user equipment in the embodiments corresponding to FIG. 2 to FIG. 11. No more details are described herein.

Figure 15:
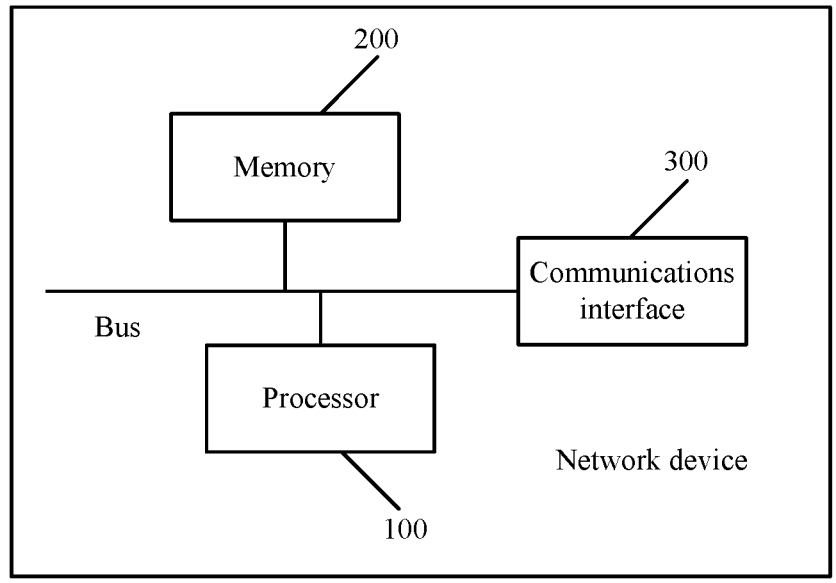
FIG. 15 is a schematic structural diagram of still another network device according to an embodiment of the present invention.

FIG. 15 is a schematic structural diagram of still another network device according to an embodiment of the present invention. Specifically, as shown in FIG. 15, the network device in this embodiment of the present invention may include a communications interface 300, a memory 200, and a processor 100. The processor 100 is connected to the communications interface 300 and the memory 200.

A data connection between the communications interface 300, the memory 200, and the processor 100 may be implemented by using a bus, or may be implemented in another manner. A connection implemented by using the bus is described in this embodiment.

The processor 100 may be a central processing unit (English: Central Processing Unit, CPU for short), a network processor (English: Network Processor, NP for short), or a combination of a CPU and an NP.

The processor 100 may further include a hardware chip. The foregoing hardware chip may be an application-specific integrated circuit (English: Application-Specific Integrated Circuit, ASIC for short), a programmable logic device (English: Programmable Logic Device, PLD for short), or a combination thereof. The foregoing PLD may be a complex programmable logic device (English: Complex Programmable Logic Device, CPLD for short), a field-programmable gate array (English: Field-Programmable Gate Array, FPGA for short), generic array logic (English: Generic Array Logic, GAL for short), or any combination thereof.

The memory 200 may include a volatile memory (English: Volatile Memory), for example, a random-access memory (English: Random-Access Memory, RAM for short); or the memory may include a non-volatile memory (English: non-volatile memory), for example, a flash memory (English: flash memory), a hard disk drive (English: Hard Disk Drive, HDD for short), or a solid-state drive (English: Solid-State Drive, SSD for short); or the memory 200 may include a combination of the foregoing types of memories.

The network device may be user equipment or may be a base station. Optionally, the memory 200 may be configured to store a program instruction, and the processor 100 invokes the program instruction stored in the memory 200, to perform one or more steps in the embodiments shown in FIG. 2 to FIG. 11 or an optional implementation in the embodiments shown in FIG. 2 to FIG. 11, so that the network device implements functions in the foregoing methods. For example, the network device may implement, by using the foregoing modules, some or all of the steps performed by the network device, for example, user equipment, in the channel transmission methods in the embodiments corresponding to FIG. 2 to FIG. 11.

Figure 16:
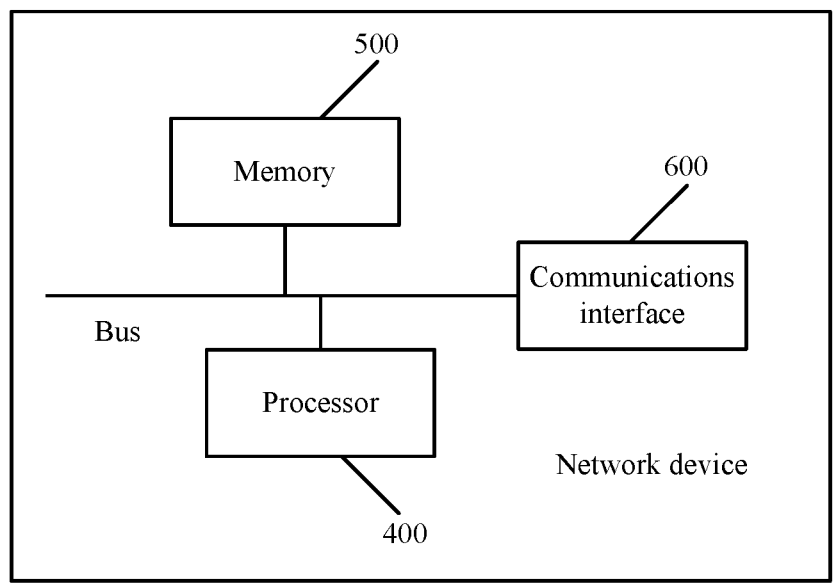
FIG. 16 is a schematic structural diagram of yet another network device according to an embodiment of the present invention.

FIG. 16 is a schematic structural diagram of yet another network device according to an embodiment of the present invention. Specifically, as shown in FIG. 16, the network device in this embodiment of the present invention may include a communications interface 600, a memory 500, and a processor 400. The processor 400 is connected to the communications interface 600 and the memory 500.

A data connection between the communications interface 600, the memory 500, and the processor 400 may be implemented by using a bus, or may be implemented in another manner. A connection implemented by using the bus is described in this embodiment.

The processor 400 may be a CPU, an NP, or a combination of a CPU and an NP.

The processor 400 may further include a hardware chip. The hardware chip may be an ASIC, a PLD, or a combination thereof. The PLD may be a CPLD, an FPGA, a GAL, or any combination thereof.

The memory 500 may include a volatile memory (English: Volatile Memory), for example, a RAM; the memory may include a non-volatile memory (English: non-volatile memory), for example, a flash memory (English: flash memory), an HDD, or an SSD; or the memory 500 may include a combination of the foregoing types of memories.

The network device may be a base station or may be user equipment. Optionally, the memory 500 may be configured to store a program instruction, and the processor 400 invokes the program instruction stored in the memory 500, to perform one or more steps in the embodiments shown in FIG. 2 to FIG. 11 or an optional implementation in the embodiments shown in FIG. 2 to FIG. 11, so that the network device implements functions in the foregoing methods. For example, the network device may implement, by using the foregoing modules, some or all of the steps performed by the network device, for example, a base station, in the channel transmission methods in the embodiments corresponding to FIG. 2 to FIG. 11.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present invention are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

What is claimed is:

1. A network device, the network device comprising:
at least one processor;
a memory storing instructions executable by the at least one processor, wherein the instructions, when executed by the at least one processor, instruct the at least one processor to:
  determine search spaces of at least two downlink control channels, wherein the search spaces of the at least two downlink control channels are the same, the search spaces of the at least two downlink control channels are determined based on an identifier of a first time element, wherein identifiers of first time elements of the at least two downlink control channels are determined based on subcarrier spacings of resources occupied by the at least two downlink control channels, or wherein identifiers of first time elements of the at least two downlink control channels are determined based on identifiers of time elements, corresponding to the first time elements of the at least two downlink control channels, among time elements corresponding to a preset subcarrier spacing, and wherein determining the search spaces of the at least two downlink control channels comprises:
    determining a first search space of a first downlink control channel; and
    determining a second search space of a second downlink control channel;
  separately determine, in the search spaces, the resources occupied by the at least two downlink control channels, wherein resources scheduled by the at least two downlink control channels belong to one carrier, and wherein separately determining the resources occupied by the at least two downlink control channels comprises:
    determining, in the first search space, a first resource occupied by the first downlink control channel; and
    determining, in the second search space, a second resource occupied by the second downlink control channel; and
  obtain the at least two downlink control channels by using the resources, wherein obtaining the at least two downlink control channels by using the resources comprises:
    obtaining the first downlink control channel by using the first resource; and
    obtaining the second downlink control channel by using the second resource.

* * * * *